(12) United States Patent
Atkinson

(10) Patent No.: US 7,803,053 B2
(45) Date of Patent: Sep. 28, 2010

(54) SYSTEM FOR REAL-TIME GAME NETWORK TRACKING

(75) Inventor: Keith W. Atkinson, Henderson, NV (US)

(73) Assignee: IGT, Reno, NV (US)

( * ) Notice: Subject to any disclaimer, the term of this patent is extended or adjusted under 35 U.S.C. 154(b) by 1430 days.

(21) Appl. No.: 10/755,202

(22) Filed: Jan. 8, 2004

(65) Prior Publication Data

US 2004/0214622 A1    Oct. 28, 2004

Related U.S. Application Data

(63) Continuation-in-part of application No. 10/723,375, filed on Nov. 25, 2003.

(60) Provisional application No. 60/477,664, filed on Jun. 10, 2003, provisional application No. 60/439,084, filed on Jan. 8, 2003.

(51) Int. Cl.
*G06F 17/00* (2006.01)
(52) U.S. Cl. ........................................................ 463/42
(58) Field of Classification Search ................... 463/42, 463/29, 16–25; 709/252, 223
See application file for complete search history.

(56) References Cited

U.S. PATENT DOCUMENTS

| | | | |
|---|---|---|---|
| 5,761,647 A | 6/1998 | Boushy | |
| 5,876,284 A | 3/1999 | Acres et al. | |
| 6,001,016 A | 12/1999 | Walker et al. | |
| 6,110,044 A | 8/2000 | Stern | |
| 6,254,483 B1 | 7/2001 | Acres | |
| 6,371,852 B1 | 4/2002 | Acres | |
| 6,394,907 B1 | 5/2002 | Rowe | |
| 6,682,423 B2 * | 1/2004 | Brosnan et al. | 463/29 |
| 6,885,901 B2 * | 4/2005 | Tomii | 700/97 |
| 6,908,390 B2 | 6/2005 | Nguyen et al. | |
| 6,923,724 B2 | 8/2005 | Williams | |
| 2001/0041612 A1 | 11/2001 | Garahi et al. | |

(Continued)

FOREIGN PATENT DOCUMENTS

WO    WO 9612262    12/1999

(Continued)

OTHER PUBLICATIONS

"Mobile Data Access", Oct. 17, 2003, XP002331193, Internet URL:http://web.archive.org/web/20031017154345/www.acresgaming.com/view_story.cfm?ContID=227&GPCatID=2&PCatID=6>.

(Continued)

*Primary Examiner*—Ronald Laneau
(74) *Attorney, Agent, or Firm*—Weaver Austin Villeneuve & Sampson LLP

(57) ABSTRACT

A data presentation system that allows a user to view information from a game network in real-time is disclosed. Information is collected from a game network and stored in a data repository. Data is gathered from the data repository, filtered, formatted, and displayed on a viewer of a user machine connected to the data presentation system. The user machine may be wired or wireless, and can include handheld devices as well. A user can select from a number of data views and customize the views, thus ensuring that the desired information is available to the user. Information is updated at a pre-selected rate, or as the network allows. Pre-filtering of data can provide notice to a user when predetermined network events occur.

23 Claims, 15 Drawing Sheets

U.S. PATENT DOCUMENTS

| | | | |
|---|---|---|---|
| 2002/0040313 | A1 | 4/2002 | Hunter et al. |
| 2002/0042296 | A1 | 4/2002 | Walker et al. |
| 2002/0090988 | A1 | 7/2002 | Frost et al. |
| 2002/0098888 | A1 | 7/2002 | Rowe et al. |
| 2002/0165023 | A1 | 11/2002 | Brosnan et al. |
| 2002/0187834 | A1 | 12/2002 | Rowe et al. |
| 2003/0036425 | A1 | 2/2003 | Kaminkow et al. |
| 2003/0069071 | A1 | 4/2003 | Britt et al. |
| 2003/0109308 | A1 | 6/2003 | Rowe |
| 2004/0002386 | A1 | 1/2004 | Wolfe et al. |
| 2004/0063498 | A1* | 4/2004 | Oakes et al. .................. 463/42 |
| 2004/0127291 | A1 | 7/2004 | George et al. |
| 2004/0214622 | A1 | 10/2004 | Atkinson |
| 2007/0021198 | A1* | 1/2007 | Muir et al. ..................... 463/29 |

FOREIGN PATENT DOCUMENTS

| | | |
|---|---|---|
| WO | WO 2004/064354 | 7/2004 |

OTHER PUBLICATIONS

"Slot Accounting", Oct. 17, 2003, XP002331194, Internet URL:http://web.archive.org/web/20031209220335/www.acresgaming.com/view_category.cfm?GPCatID=2&PCatID=8>.

"Graphical Mapping Analysis", Oct. 10, 2003, XP002331195, Internet URL:http://web.archive.org/web/20031010134942/www.acresgaming.com/view_category.cfm?GPCatID=2&PCatID=13>.

"Cage Credit Table Games", Oct. 10, 2003, XP002331196, Internet URL:http://web.archive.org/web/20031010141816/www.acresgaming.com/view_category.cfm?GPCatID=2&PCatID=9>.

"Network", Jun. 22, 2003, pp. 1, XP002331197, Internet URL:http://web.archive.org/web/20030623015856/www.acresgaming.com/view_category.cfm?GPCatID=2&PCatID=14>.

Wang, Z., et al. "*Casino Technology: Player Tracking and slot Accounting Systems,*" Gaming Research and Review Journal, UNLV, International Gaming Institute, Las Vegas, NV, US, vol. 6, No. 1, 2000, pp. 43-56.

Office Action mailed Nov. 1, 2007 in U.S. Appl. No. 10/723,375, filed Nov. 25, 2003.

Office Action mailed May 31, 2007 in U.S. Appl. No. 10/723,375, filed Nov. 25, 2003.

Office Action mailed Oct. 12, 2006 in U.S. Appl. No. 10/723,375, filed Nov. 25, 2003.

Office Action mailed Jul. 30, 2007 in U.S. Appl. No. 11/036,530, filed Jan. 12, 2005.

Office Action mailed Jan. 11, 2007 in U.S. Appl. No. 11/036,530, filed Jan. 12, 2005.

U.S. Office Action mailed Mar. 14, 2008, from U.S. Appl. No. 11/036,530.

U.S. Office Action mailed Apr. 24, 2008, from U.S. Appl. No. 10/723,375.

Canadian Office Action dated Jun. 15, 2005 from corresponding CA Application No. 2,491,431.

British Examination Report dated Oct. 26, 2005, from corresponding British Application No. 0503823.7.

British Examination Report dated May 26, 2006, from corresponding British Application No. 0503823.7.

British Examination Report dated Oct. 24, 2006, from corresponding British Application No. 0503823.7.

British Examination Report dated Jan. 17, 2007, from corresponding British Application No. 0503823.7.

British Examination Report dated Mar. 26, 2007, from corresponding British Application No. 0503823.7.

International Search Report and dated Jul. 5, 2004, from corresponding PCT Application No. PCT/US04/000568.

EP Office Action mailed Dec. 4, 2006, from EP Application No. 05711513.1.

EP Summons to Attend Oral Proceedings mailed Aug. 13, 2007, from EP Application No. 05711513.1.

International Search Report and dated Jun. 28, 2005, for corresponding PCT Application No. PCT/US05/001386.

Australia Examination Report dated Jun. 3, 2008 from corresponding Australia Application No. 2004205042.

Canadian Office Action dated Sep. 4, 2008 from corresponding Canada Application No. 2,491,431.

US Office Action dated Oct. 27, 2008 from U.S. Appl. No. 10/723,375.

U.S. Office Action dated Oct. 16, 2008 from U.S. Appl. No. 11/036,530.

U.S. Office Action mailed Apr. 14, 2009 from U.S. Appl. No. 10/723,375.

U.S. Office Action mailed May 27, 2009 from U.S. Appl. No. 11/036,530.

Canadian Office Action dated Jul. 8, 2009 from corresponding Canada Application No. 2,491,431.

U.S. Advisory Action dated Feb. 12, 1009 from U.S. Appl. No. 10/723,375.

U.S. Office Action dated Nov. 2, 2009 from U.S. Appl. No. 10/723,375.

U.S. Advisory Action dated Jan. 23, 2009 from U.S. Appl. No. 11/036,530.

U.S. Office Action mailed Jan. 26, 2010 from U.S. Appl. No. 11/036,530.

* cited by examiner

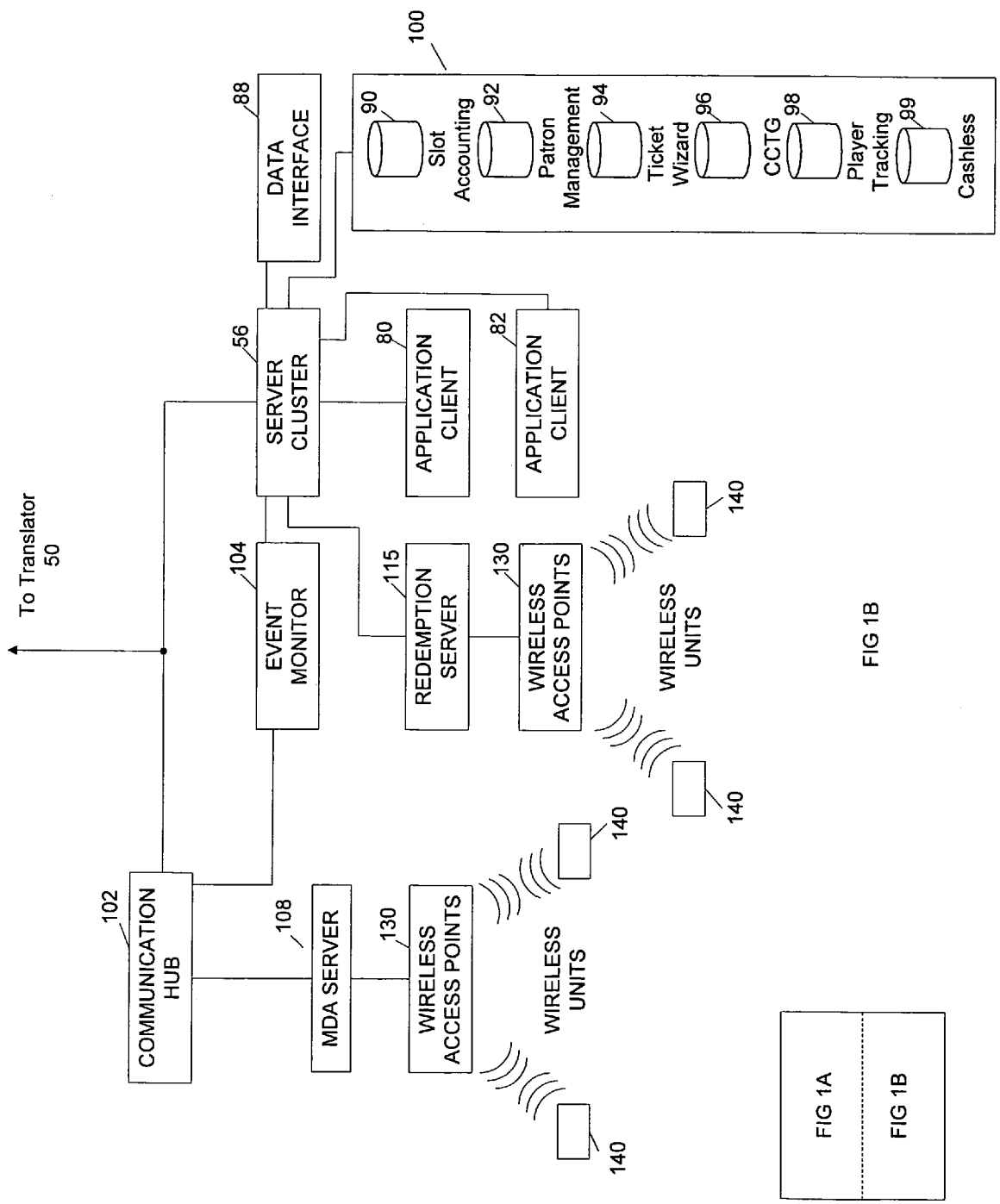

Trip History for JAY BOLAN

| Date | Location | Coin In | Theo Hold | Games Played |
|---|---|---|---|---|
| 2002-05-30 23:26:00 | H1803 | $757.00 | 435 | 95 |
| 2002-05-30 23:31:00 | H1803 | $113.00 | 435 | 13 |
| 2002-05-30 23:36:00 | H1002 | $250.00 | 435 | 30 |
| 2002-05-30 23:44:00 | H1001 | $2115.00 | 435 | 255 |
| 2002-05-30 23:50:00 | H1001 | $167.00 | 435 | 19 |
| 2002-05-31 00:07:00 | H1002 | $1269.00 | 435 | 167 |
| 2002-05-31 01:35:00 | P0115 | $468.00 | 435 | 52 |
| 2002-05-31 01:39:00 | P0116 | $777.00 | 435 | 101 |
| 2002-05-31 02:19:00 | P0113 | $2767.00 | 435 | 353 |
| 2002-05-31 02:20:00 | P0114 | $0.00 | 435 | 0 |
| 2002-05-31 02:27:00 | H1005 | $153.00 | 435 | 17 |
| 2002-05-31 02:34:00 | H1001 | $239.00 | 435 | 27 |
| 2002-05-31 02:35:00 | H1007 | $594.00 | 435 | 76 |
| 2002-05-31 02:45:00 | H1007 | $423.00 | 435 | 49 |
| 2002-05-31 02:45:00 | H1006 | $242.00 | 435 | 28 |
| 2002-05-31 02:53:00 | H1002 | $60.00 | 435 | 12 |
| 2002-05-31 02:54:00 | H1007 | $406.00 | 435 | 56 |
| 2002-05-31 03:12:00 | J0803 | $604.00 | 435 | 68 |
| Totals | | $11404.00 | 7830 | 1418 |

FIG. 10

Events for Machine 41085

| Date | Description | MtrGames | Cardid | Staffid |
|---|---|---|---|---|
| Dec 18 2002 10:00AM | Bill 100 inserted | 212247 | 001123091100292654 | |
| Dec 18 2002 09:59AM | Hot player | 212236 | 001123091100292654 | |
| Dec 18 2002 09:57AM | Bill 100 inserted | 212225 | 001123091100292654 | |
| Dec 18 2002 09:57AM | Card Inserted | 212225 | 001123091100292654 | |
| Dec 17 2002 08:57PM | Cash out button pressed | 212225 | | |
| Dec 17 2002 08:57PM | Cash out button pressed | 212225 | | |
| Dec 17 2002 08:57PM | Cash out button pressed | 212224 | | |
| Dec 17 2002 08:57PM | Cash out button pressed | 212224 | | |
| Dec 17 2002 08:53PM | Bill 1 inserted | 212214 | | |
| Dec 17 2002 07:07PM | Card removed | 212214 | 001123011000670819 | |
| Dec 17 2002 07:06PM | Cash out button pressed | 212214 | 001123011000670819 | |
| Dec 17 2002 07:06PM | Cash out button pressed | 212214 | 001123011000670819 | |
| Dec 17 2002 06:54PM | Bill 20 inserted | 212173 | 001123011000670819 | |
| Dec 17 2002 06:53PM | Card Inserted | 212173 | 001123011000670819 | |
| Dec 17 2002 11:00AM | Card removed | 212173 | 001123050700020685 | |
| Dec 17 2002 10:25AM | Bill 100 inserted | 211884 | 001123050700020685 | |
| Dec 17 2002 10:23AM | Bill 20 inserted | 211868 | 001123050700020685 | |
| Dec 17 2002 10:22AM | Bill 20 inserted | 211863 | 001123050700020685 | |
| Dec 17 2002 10:21AM | Bill 20 inserted | 211857 | 001123050700020685 | |
| Dec 17 2002 10:14AM | Hot player | 211795 | 001123050700020685 | |
| Dec 17 2002 10:10AM | Bill 20 inserted | 211775 | 001123050700020685 | |
| Dec 17 2002 10:10AM | Card Inserted | 211775 | 001123050700020685 | |

FIG. 11

HeadCount
Date: 2002-12-18

| Time | Carded | UnCarded | Total |
|------|--------|----------|-------|
| 04 00 | 3 | 16 | 19 |
| 05 00 | 3 | 29 | 32 |
| 06 00 | 4 | 25 | 29 |
| 07 00 | 8 | 22 | 30 |
| 08 00 | 10 | 21 | 31 |
| 09 00 | 17 | 23 | 40 |
| 10 00 | 20 | 90 | 110 |
| Average | 9 | 32 | 42 |
| Total | 65 | 226 | 291 |

Previous Day

FIG. 12

Host Hot Player Report
Date: 2002-12-18

| Start Time | Duration | Location | Games | Coin In | Check Time | Initials | Credits |
|------------|----------|----------|-------|---------|------------|----------|---------|
| 22:32 | 92 min | L2002 | 216 | $111.75 | | | |
| 00:36 | 12 min | J3607 | 160 | $480.00 | | | |
| 00:57 | 7 min | J3607 | 55 | $165.00 | | | |
| 01:05 | 4 min | D3201 | 1 | $3.00 | | | |
| 01:15 | 20 min | A3404 | 201 | $577.00 | | | |
| 01:48 | 17 min | A3606 | 23 | $16.50 | | | |
| 02:02 | 4 min | L2203 | 0 | $0.00 | | | |
| 02:10 | 13 min | D3202 | 21 | $63.00 | | | |
| 02:22 | 9 min | J3607 | 115 | $345.00 | | | |
| 02:42 | 5 min | L2203 | 0 | $0.00 | | | |
| 02:57 | 12 min | J3607 | 173 | $519.00 | | | |
| 03:13 | 6 min | J3607 | 60 | $180.00 | | | |
| 03:24 | 19 min | J3607 | 275 | $825.00 | | | |
| 03:46 | 66 min | J3607 | 152 | $456.00 | | | |
| 04:47 | 10 min | H3806 | 78 | $164.00 | | | |
| 05:55 | 10 min | H1806 | 138 | $690.00 | | | |
| 06:51 | 13 min | C0605 | 187 | $233.75 | | | |
| 07:06 | 13 min | J3601 | 230 | $690.00 | | | |

FIG. 13

SYSTEM FOR REAL-TIME GAME NETWORK TRACKING

CROSS REFERENCE TO RELATED APPLICATIONS

The present application claims priority under 35 U.S.C. §119 to U.S. Provisional Application Ser. No. 60/439,084 entitled "System for Real-time Game Network Tracking", filed Jan. 8, 2003, the entirety of which is incorporated herein by reference in its entirety for all purposes.

The present application also claims priority under 35 U.S.C. §119 to U.S. Provisional Application Ser. No. 60/477,664 filed Jun. 10, 2003, entitled "Mobile Data Access," the entirety of which is incorporated herein by reference in its entirety for all purposes.

This application is a continuation-in-part of prior U.S. patent application Ser. No. 10/723,375, filed Nov. 25, 2003, entitled "Mobile Data Access," from which priority is claimed pursuant to the provisions of 35 U.S.C. 120, the entirety of which is incorporated herein by reference for all purposes.

TECHNICAL FIELD

This disclosure relates to networked gaming devices, and, more specifically, to a system for monitoring activity of the gaming devices and the players using the gaming devices as the devices are being played.

BACKGROUND

Gaming machines are popular entertainment devices. Present gaming machines provide an opportunity for a user to play a variety of popular games on the machines, such as fruit machines or slot-type games, video adaptations of standard card games like poker and blackjack, and many other types of games.

Modern gaming machines are coupled to a gaming network that performs many management type functions, such as accounting, game tracking, player tracking, and bonusing. Typical gaming networks are able to generate written reports at various times. For instance, a gaming network may print daily, weekly and monthly summary totals of items of interest to a network operator, such as number of players on the network, average amount bet, average theoretical hold, etc. Such reports may take time to be scheduled, printed, delivered, and analyzed. Thus, any modifications to the gaming network based on the printed reports may take place long after the data that appears in the reports was collected.

Embodiments of the invention address these and other deficiencies in casino gaming systems.

SUMMARY

In one aspect, the invention features a gaming network comprising a plurality of gaming machines and one or more information servers coupled to the plurality of gaming machines. The one or more information servers are structured to store data related to the plurality of gaming machines and related to players of the gaming machines. The one or more information servers are also structured to generate data for use on the gaming network. The gaming network further includes a secure wireless server coupled to the one or more information servers and one or more secure wireless receivers structured to couple to the secure wireless server. Additionally, the gaming network includes an image generator coupled to the one or more information servers and to the secure wireless server. The image generator is structured to generate an image for display on one or more of the receivers, the image including data stored on the one or more information servers.

In another aspect, the invention features a method of operating a gaming network. The method comprises assembling data from one or more of the gaming devices coupled to the gaming network, generating a graphic display of data gathered from the assembled data, and displaying the graphic display on a wireless component coupled to the gaming network.

BRIEF DESCRIPTION OF THE DRAWINGS

The description may be best understood by reading the disclosure with reference to the accompanying drawings.

FIGS. 1A and 1B (FIG. 1) together are a block diagram showing components of a gaming network according to embodiments of the invention.

FIGS. 8-19 are example information screens that can be produced by embodiments of the invention.

DETAILED DESCRIPTION

Embodiments of the invention include a data presentation system that presents data about a gaming network in real-time. Users can view information presented to a screen or display. In some embodiments of the invention, the data is communicated to a handheld device over a wireless network, which is accessed by a user. The user can select data summaries for past events or can capture network events as they occur.

In embodiments of the invention, information is collected from a game network and stored in a data repository. Data is gathered from the data repository, filtered, formatted, and displayed on a viewer of a user machine connected to the data presentation system. A user can select from a number of data views and customize the views, thus ensuring that the desired information is available to the user. Information is updated at a pre-selected rate, or as the network allows.

Embodiments of the invention are also directed to a gaming network that supplies data that can be accessed by devices over a secure wireless network. Wireless servers or hosts generate communication and data channel signals that are sent to wireless receivers used by casino operators or employees. Users of the wireless receivers establish a secure session with a wireless server running on the gaming network. Once the secure session is established, applications on the wireless servers can request data from the server and/or provide data to the server. For some applications, the data can be requested to service users of games on the gaming network.

As mentioned above, embodiments of the invention operate in conjunction with a gaming network. An example modern gaming network is described in U.S. Pat. No. 6,245, 483B1, assigned to the assignee of the present invention, the teachings of which are incorporated herein in their entirety for all purposes.

Figure 1A:
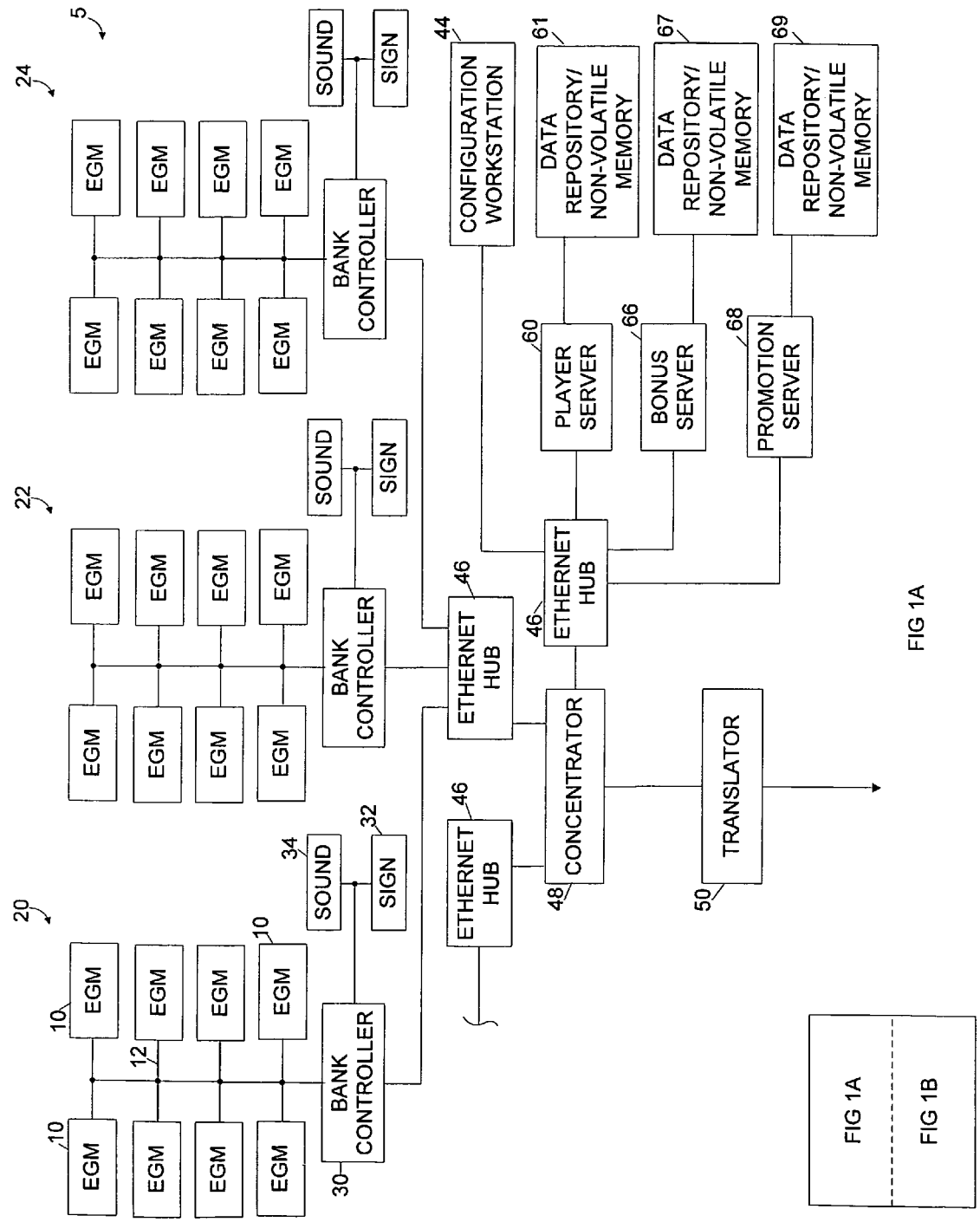

Another such gaming network is illustrated in FIGS. 1A and 1B. In a gaming network 5, a number of EGMs 10 are organized in groups called banks. Individual banks 20, 22, and 24 can contain almost any number of gaming devices 10. Additionally, any number of banks is possible in a gaming network 5.

Each bank is controlled by a bank controller 30, which is coupled to each EGM 10 by a communication cable 12. The bank controller 30 facilitates data communication between the gaming devices 10 in its associated bank and the other components on the gaming network 5. In some embodiments, the bank controller 30 need not be present, and the EGMs 10 communicate directly with the other portions of the gaming network 5.

Configuration data for the gaming network 5 is stored in one or more network data repositories 61, 67, 69. In some embodiments, the data repositories 61, 67,69 are made of battery backed-up non-volatile SRAM (Static Random Access Memory), which provides dual advantages of having extremely fast data input and output, and having a power source that is independent from the network 5 or the gaming devices 10. The data repositories 61, 67, 69 may also be mirrored, i.e., duplicate copies are made in real-time. This prevents data from being lost if one of the battery sources should fail or some other catastrophic event occurs. Data is stored in the data repositories 61, 67, 69 using CRCs (Cyclic Redundancy Checks) and timestamps to ensure the data is valid and non-corrupt.

Configuration data is created at a configuration workstation 44 and stored in the data repositories 61, 67, 69. Configuration data includes message data for players as well as for promotions such as bonuses. Player message data is stored in the data repository 61, where it can be accessed by a player server 60. Player message data can include welcoming messages, card-in/card-out messages, and special messages about current promotions, for instance. The player server 60 reads the message data from the data repository 61 and sends a properly formatted message back to the bank controllers 30 and EGMs 10. These player messages may be displayed on a screen 32 for an entire bank, or may be shown on a screen directly mounted to the EGM 10 (not shown).

Other configuration data created at the configuration workstation 44 and stored in the data repositories 61, 67, 69 includes casino configuration data, such as identification of each EGM 10 on a casino floor. Additional parameters stored in the data repository 67, 69 are parameters used in promotions, such as bonus promotions. These parameters include such items as what EGMs 10 are included in the promotion, how to fund a bonus, i.e., if a bonus is funded by a portion of the coin-in amount of the EGMs 10, whether a paid bonus is to be taxed or un-taxed, and other parameters.

As players play the EGMs 10 in the gaming network 5, the EGMs send data from their coin meters, or meter values. One or more bonus server 66 and/or promotion server 68 stores these meter values, or summaries of the meter values, in its associated data repository 67. The servers 66, 68 can also operate based on the present and stored meter values to determine an amount of money being wagered on the EGMs in near real-time. The servers 66, 68 can use the amount of money being wagered to calculate bonus pools that are funded as a percentage of the coin-in of participating EGMs 10. For instance, the servers 66, 68 can calculate a present amount of a bonus pool that is funded at one-half of one percent of the coin-in for the participating EGMs 10. An example of bonuses that can be operated from the bonus server 66 includes LUCKY COIN and progressive bonuses, for example.

Of course, the servers 60, 66, 68 could be embodied in a single device, or in other configurations, and do not have to appear in FIG. 1A, which is only a functional representation. Likewise, the data repositories 61, 67, 69 could be embodied in a single device.

As data is generated by the EGMs 10, data is passed through communication hardware, such as Ethernet hubs 46, and a concentrator 48. Of course, switches or bridges could also be used. The concentrator 48 is also coupled to a translator 50, which includes a compatibility buffer so that the data from the EGMs 10 can be used by a server cluster 56 (FIG. 1B), and other parts of the gaming network 5.

The server cluster 56 (FIG. 1B) may, of course, be embodied by more than one physical server box. In practice, including multiple server boxes with dynamic load sharing and backup capabilities of one another ensures the gaming network 5 is nearly always operational.

The server cluster 56 is attached to and manages several databases, such as a slot accounting database 90, a patron management database 92, a ticket wizard database 94, a "Cage Credit and Table Games" (CCTG) database 96, a player tracking database 98, and a cashless database 99. These databases are collectively referred to as the databases 100. Of course these databases 100 are only exemplary, and more or fewer databases can be part of the gaming network 5. In some embodiments, particular servers in the server cluster 56 manage a single database. For example, a single server in the server cluster 56 may manage the slot accounting database 90, while another server manages the patron management database 92. Such implementation details are well within the expertise of one skilled in the art. However, for ease of illustration, FIG. 1 shows a single server cluster 56 that is coupled to all of the databases 100.

In operation, the slot accounting database 90 receives and stores statistical and financial information about the EGMs, such as dates, times, totals, game outcomes, etc. The patron management database 92 stores information regarding identified players, such as how often and which games they play, how often they stay in the casino, their total loyalty points, past awards, preferences, etc. The ticket wizard database 94 stores data about tickets that are issued by the EGMs, such as payouts and cashout tickets, as well as promotional tickets.

The CCTG database 96 stores information about non-EGM 10 data in a casino. That data is typically generated by a client station (not shown) coupled to one of the bank controllers 30. The client station can be located in a casino cage or at a table game, for instance, and data generated by the client station is forwarded to the CCTG database 96 where it is stored. For example, data such as when and how many chips a customer buys, when a customer creates or pays off markers, when a customer cashes checks, etc. is stored in the CCTG database 96.

The player tracking database 98 is a subset database of the patron management database 92, and is used when data retrieval speed is important, such as for real time promotions and bonusing. The cashless database 99 stores information about payment options other than bills, coins, and tokens.

Application clients 80 and 82 couple to the server cluster 56, and can retrieve data from any or all of the databases 100. Application programs run on an application client 80, 82 provide users information about the gaming network 5 and the casino in which the network is established and cause functions to operate on the gaming network 5. An example application client 80 could include, for instance, an accounting server that allows queries and provides reports on financial and statistical information on single or groups of EGMs 10.

A data interface 88 presents a uniform interface to other applications and servers (not shown), and grants access to retrieve data from the databases 100. Typically these other clients or servers would not be controlled by the same entity that provides the other components of the gaming network 5, and therefore the data interface 88 grants only guarded access to the databases 100. Other components of the gaming network 5 of FIG. 1 are discussed in detail below.

Figure 2:
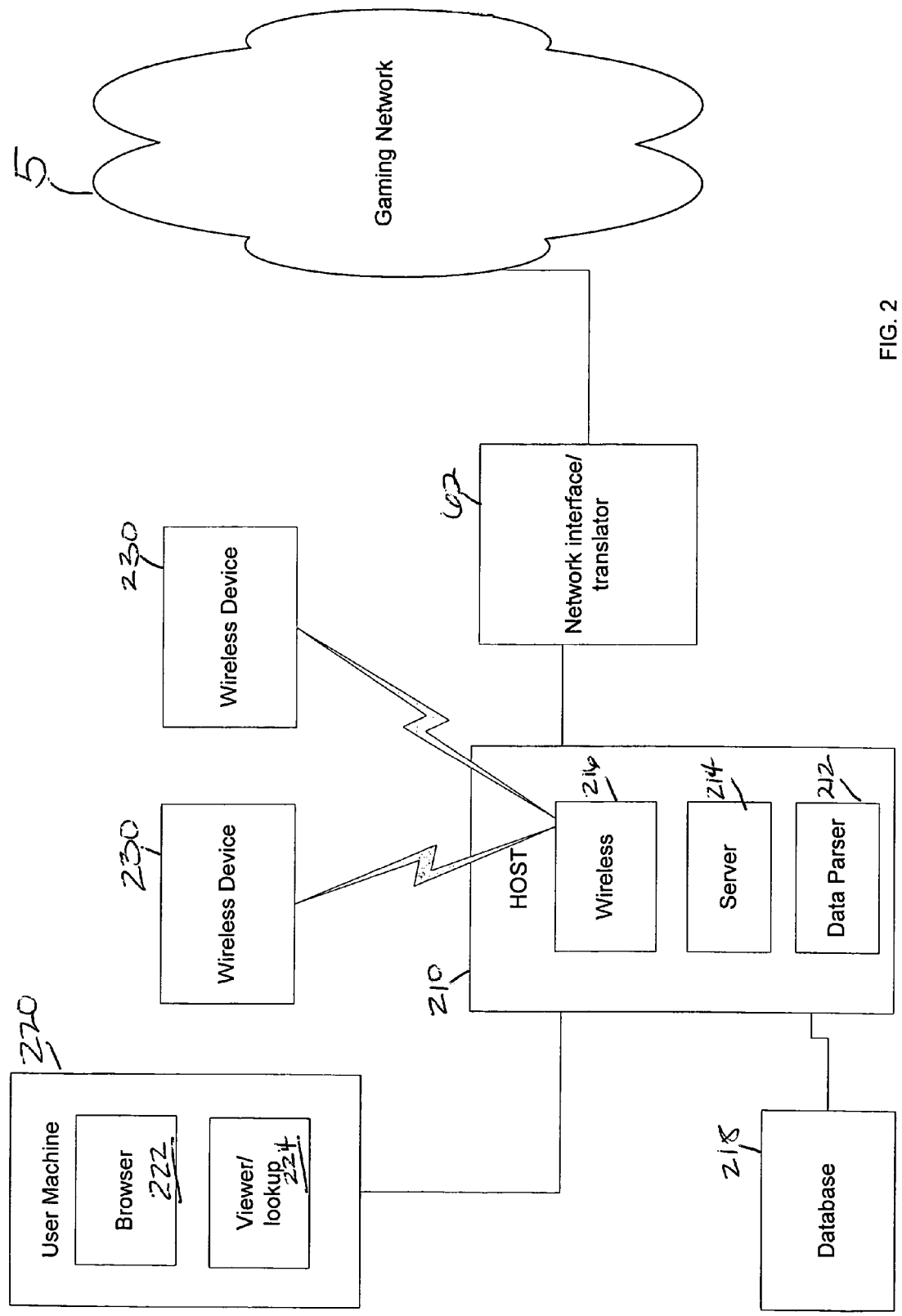
FIG. 2 is a functional block diagram of a system for tracking network data according to embodiments of the invention.

FIG. 2 illustrates another possible implementation of a data presentation system according to embodiments of the invention. The data presentation system of FIG. 2 generally includes a host 210, a user machine 220, and/or wireless devices 230. Additionally, the host 210 and user machine 220 include sub-components, as described below.

The host 210 is coupled to an interface 62, which may be the same or different from the translator 50 of FIG. 1. The interface 62 provides data from the gaming network that can be accessed by the host 210. Data provided by the interface 62 can include any and all of the data available on the gaming network 5, as described above. The gaming network may span multiple physical properties or casinos. Additionally, the interface 62 may be a gaming network that has a different configuration than the network 5 illustrated in FIG. 1. The interface 62 can relate data from any type of gaming network to the host 210. For instance, the interface 62 can retrieve player session packet information from the concentrator 50 and/or the translator 60. Or, the interface 62 can retrieve data directly from a buffer.dat file, which can be a read/write file with data from a gaming network 5.

The host 210 includes a data parser 212, a server, such as an "http" or "web" server 214, and a wireless host component 216. Additionally, the host 210 is coupled to a database 218, which may or may not be physically included in a same cabinet as the host 210. As data is received from the interface 62, such as data collected anywhere from the gaming network 5, it is separated or "parsed" by the data parser 212, and stored on the database 218.

The user machine 220, if present, can include a browser 222, or some other type of viewer or lookup 224, such as a database query tool having its own presentation interface. The browser 222 could be a web browser or some other browser capable of displaying data, charts, graphs, etc. In operation, data is requested by the browser 222, which couples to the host server 214. The host server 214 then communicates to the database 218, formats data retrieved from the database 218, and then sends it to the user machine 220. The data is then displayed on the browser 222 using HTML or some other protocol for viewing by a user. The browser 222 may specifically request data from the server 214 based on commands input from the user of the user machine 220, or the server 214 may be set to automatically "push" data to the browser 222 on the user machine 220. The browser 222 may automatically update, or automatically request new data every so often, for example every 30 seconds. Or, the server 214 may be set to push new data to the browser 222 every so often.

The data presentation system can also include one or more wireless devices 230. The wireless devices 230 communicate through a wireless network, for example an 801.11b wireless Ethernet network to the wireless host 216 in the host machine 210. Data is served to the wireless device 230 similar to how it is served to the browser 222 described above.

The host machine 210 could be embodied by a microcomputer having one of the Pentium™ processors, operating at, for instance 500 Mhz or faster. The host machine can include a 20 GB or larger hard drive. The wireless host can be a WAP (Wireless Application Protocol) host. The operating system can be a Linux™ operating system, for example Apache 1.3.15. The database 218 could be a database that can be accessed via SQL (Structured Query Language), for example a "MySQL" database. The server 214 may communicate to the database 218 by using PHP 4 (Hypertext Preprocessor), server side scripting and database access, and ODBC, (Open DataBase Connectivity) for example. 128-bit encryption, SSL, can also be used to protect the network from unauthorized access.

User machines 220 could be desktop or laptop microcomputers, running a browser such as Internet Explorer™ (IE) or Netscape Navigator™, for instance. The wireless devices 230 could include a laptop, notebook, or palm computer, such as an iPAQ, by Compaq Computer. The wireless devices 230 may run a Windows CE™/Pocket PC operating system, for instance, which support a web browser, such as IE 4. The browser 222 or wireless devices may also support Flash 5.0, for specialized graphic display and animation (charts and graphical meters). The wireless network is a secured network, such as FHP, and uses other forms of security known in the art of wireless computing.

In operation, the browser 222 provides complete application functionality, in that users have full interactive access and control of the data displayed. As described below, data is displayed in numeric output as well as graphical (line graphs and bar charts) representations that refresh at intervals. The intervals may be as fast as one- to two-seconds, or could be longer, where applicable. Users have the ability to customize the view of application data, ensuring that the information needed is readily available. For instance, the user could be provided (in the browser 222) with a NEXT button that provides the user the ability to change display information at will. The user can also be provided with a HOLD button to freeze the display from rotating to another informational display panel. Access to the application via the wireless device 230 will results in the display of information in a manner very similar to that of the desktop Web browser. However, screen presentation may be modified to support smaller portable computer screens typically found on wireless devices 230. While features such as line graphs are incorporated in the display on the wireless device 230, the automatic update for the wireless devices 230 may be less frequent (e.g. up to 1 minute or more) than on the browser 222 on the wired user machine 220. The server 214 on the host 210 provides automatic browser detection and serves pages properly formatted for any detected browser to which it is connected. Several browsers 222 and wireless devices 230 may be coupled to the server 214 concurrently.

Some example datasets listed below are examples of what can be served to the browser 222 and the wireless device 230. Hereinafter, examples may only describe data being served to either the browser 222 on the user machine 220, or to the wireless device 230, but it is understood that data could be served to either of the browser 222 or the wireless device 230.

The server 214 can serve the data retrieved from the database 218 (or data retrieved from the database 218 and modified by the host machine 210) to the browser 222 numerically as well as graphically (display the information as a line graph over some period of time). Example datasets and data components can include, for example, Headcount (players currently playing at EGMs 10 in the network 5), Total Headcount (Occupancy), Carded Headcount (i.e., those players who are identified by player tracking cards), Un-carded Headcount, Metered Coin Activity, Total Coin In, Total Coin Out, Metered Win, Metered Win per unit, Jackpot, Average Hold, Occupancy by Denomination, Occupancy percentage by denomination for each denomination currently in play on the floor. Additionally, the server 214 can present data at a standard interval, such as per hour or per employee shift, such as occupancy percentage by section on the floor, Average fill times (i.e., the time necessary to fill a gaming device 10), Average jackpot payout time, Number of Change Staff related to Number of Supervisors for Change Staff, Number of Floor Staff related to Number of Supervisors for Floor Staff, Number of Slot Machines related Number of Supervisors for Slot Mechanics, Number of Assist Shift Mgr related to Number of Shift Mgr., Occupancy percentage of slot players, and Percentage Slot Employees, as well as other data relations.

The server 214 can be modified by programs running on the host 210, authorized users through the user machine 220 and wireless device 230, as well as through the configuration workstation 44 of FIG. 1. Some options that may be modified include the amount of time in minutes, hours, days to display graphed information, the sample times for data accumulated from real-time devices, and various rating/label values not currently available. A secured Web-based form can be used to allow user (sites) to change the system configuration.

The host 210 may communicate to the interface 62 by using COM objects, for example.

Figure 3:
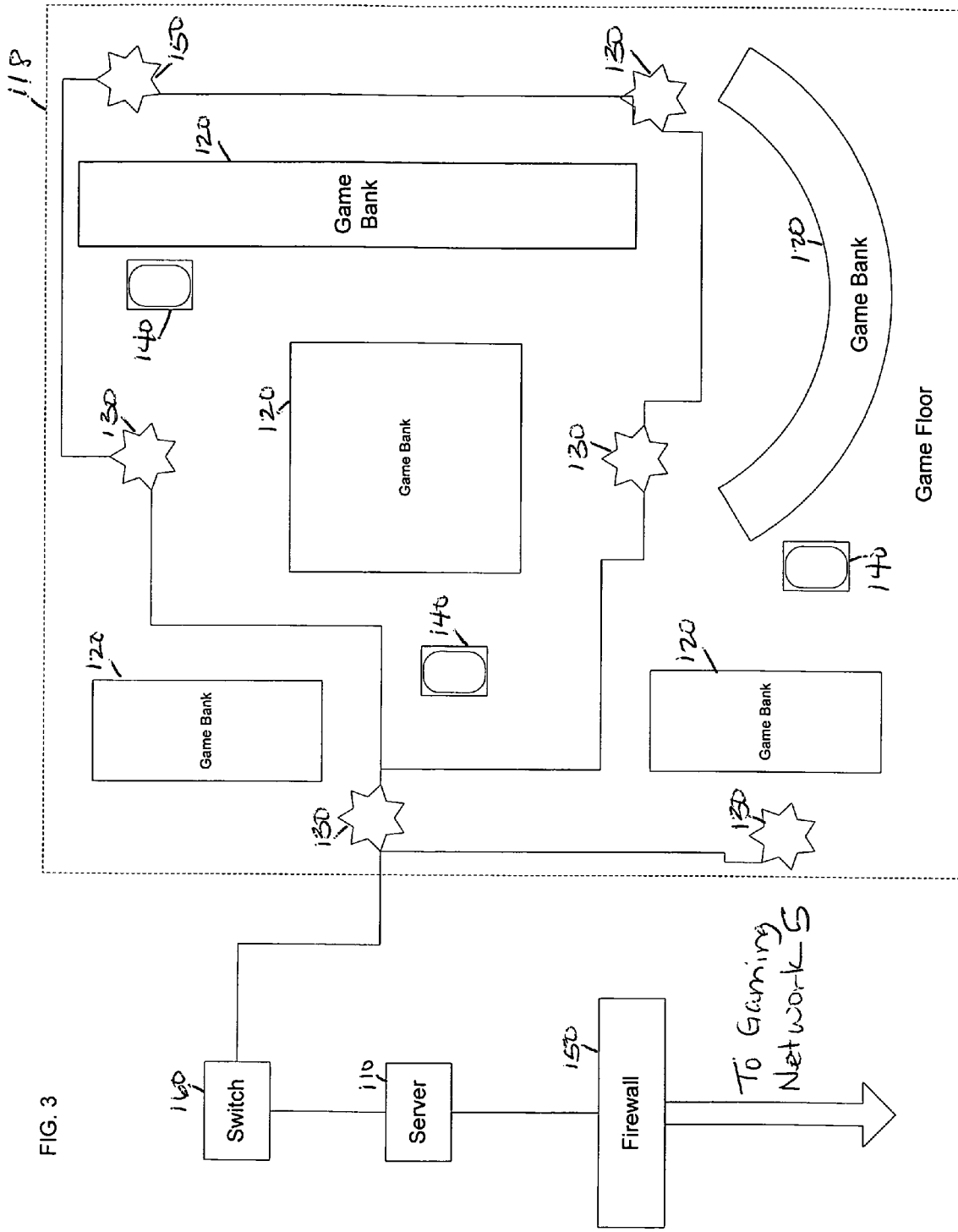
FIG. 3 is a block diagram showing example components of a secure wireless network operating in conjunction with a gaming network, according to embodiments of the invention.

FIG. 3 is a block diagram of components of the gaming system according to embodiments of the invention. FIG. 3 may include components from both FIGS. 1 and 2, and the same or similar component in FIG. 1 or FIG. 2 may be represented in FIG. 3 as a different reference number. In FIG. 3, a gaming floor 118 is illustrated. The gaming floor includes banks 120 of gaming machines. Several banks 120 are illustrated, although the number of banks on a gaming floor 118 could be as few as one (or simply a single EGM 10 not associated with any bank) or as many as is practical. Illustrated in FIG. 3 are five banks 120.

Also shown in FIGS. 1, 3 are a number of wireless servers 130, also referred to as wireless access points (WAPs). In FIG. 2, a wireless server is referenced as 210, but may include the same or similar hardware or function as the wireless servers 130. The wireless servers 130 transmit and receive RF (Radio Frequency) signals over the gaming floor 118, thereby communicating with one or more wireless devices 140. Example wireless servers 130 are those that adhering to IEEE 802.11b, 802.11a, or 802.11 g protocols, but any acceptable communication protocol could be used. The wireless servers 130 are connected to each other via wires or wireless links, as is known in the art. The wireless servers 130 and wireless devices 140 illustrated in FIG. 1 may be implemented as a same set of wireless servers 130 and wireless devices 140, or may, in fact, be separate systems, where the wireless devices 140 only communicate with a particular, and not all, wireless servers 130 in the game network 5. The wireless devices 140 both receive and transmit information to the wireless servers 130, as is known in the art.

The wireless servers 130 are distributed around the gaming floor 118 so as to cover as much of the gaming floor 118 with the RF signals as possible. In some instances, areas of the gaming floor 118 are covered with RF signals from more than one wireless server 130. In such a case, the wireless devices 140 typically automatically establish communication with the wireless server 130 that is nearest the particular wireless device 140.

The wireless servers 130 may be separated from the gaming network 5 by a firewall 150. A firewall is hardware and software operating to protect resources of a network. Specifically, the firewall 150 can be a tunneling firewall that encapsulates and encrypts data packets traveling between the wireless servers 130 and the firewall 150. An application server 110 can be used in conjunction with the wireless servers 130 on the gamefloor 118. Additionally, a switch 160 could be used to partition particular IP (Internet Protocol) or other addresses so the partitioned addresses are only available by the wireless servers 130, or the wireless devices 140 that couple to the wireless servers 130. Although illustrated outside of the gaming floor 118, the firewall 150, server 110, and switch 160 could all also be within the gaming floor 118. Their physical location is unimportant.

With reference back to FIGS. 1 and 3, the application server 110 of FIG. 3 could be embodied by a Mobile Data Access (MDA) server 108 of FIG. 1. The firewall 150 of FIG. 3 is not present in FIG. 1 but could, of course, be added between the MDA server 108 and the rest of the gaming network 5. In FIG. 1, the MDA server 108 connects to the gaming network 5 through a communication hub 102. The communication hub 102, in turn, is connected to the translator 50 and to an event monitor 104. The event monitor 104 is also coupled to the server cluster 56, which was described above.

The communication hub 102 collects data from the floor 118 as "events" when they happen and when they are reported by, for example, an EGM10. Events include, for example, doors to EGMs 10 being opened, jackpots or other large amounts being awarded, etc. The event monitor 104 is connected between the communication hub 102 and the server cluster 56. In operation, the event monitor 104 combines live data from the communication hub 102 with historical data from one or more of the databases 100, and generates warnings, indications, and signals for someone monitoring the gaming network 5. For instance, the event monitor 104 will create a warning if the door to a particular EGM 10 is opened but no employee identification card has been inserted in that EGM10.

Figure 4:
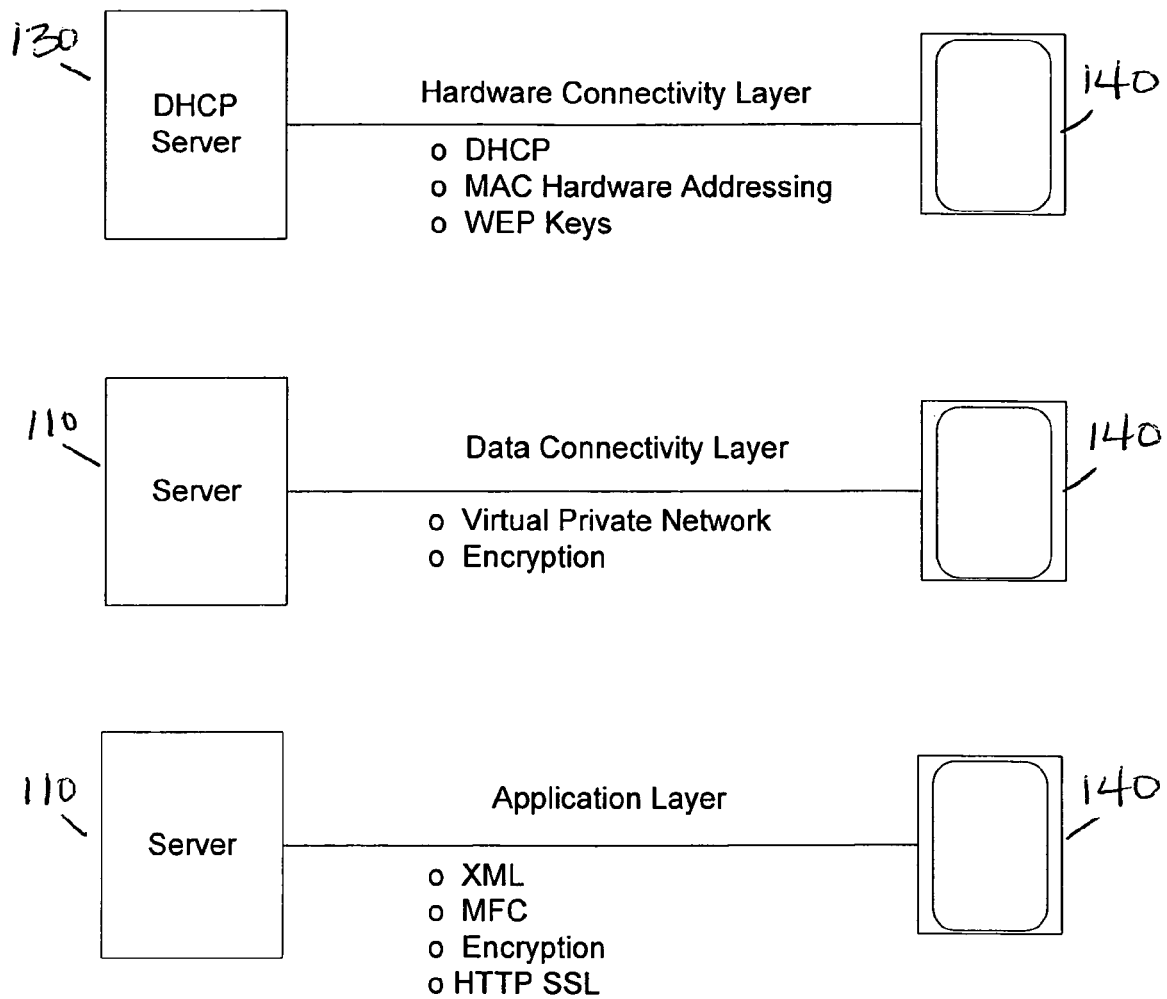
FIG. 4 is a chart illustrating different forms of security used in establishing and conducting wireless communication of data.

Operation of the wireless servers 130 and wireless devices 140 is described with reference to FIGS. 1-4. Illustrated in FIG. 4 are different example levels of providing secure communication between a wireless server 130 or application server 110 and a wireless device 140. The wireless device 140 of FIGS. 3 and 4 can also be the same or similar to the wireless devices 230 illustrated in FIG. 2. Of course, as described above, a wireless server 130 can communicate with many wireless devices 140 at the same time, as can the application server 110.

The lowest communication layer illustrated in FIG. 4 is a hardware connectivity layer. Any or all of the wireless servers 130 distributed about a game floor 118 can be a DHCP (Dynamic Host Control Protocol) server, or the DHCP server could be a program running on the application server 110. DHCP is a protocol that allows network administrators to centrally manage and automate the assignment of IP (Internet Protocol) configurations on a computer network. When IP protocols are used, each computer coupled to the gaming network uses a unique IP address. Therefore each wireless server 130 and each wireless device 140 has its own separate and unique IP address. Having a DHCP server alleviates the necessity to manage each individual IP address, and lets the DHCP server dynamically allocate the IP addresses when requested by devices attaching to the gaming network 5. The DHCP server makes IP configurations that are valid for a specific time period, called a lease period. During the lease period, those devices that are authorized to attach to the gaming network 5 are dynamically given an IP address to establish the communication.

In operation, the wireless network and the DHCP wireless units are assigned an ESSID (Extended Service Set Identifier), which identifies a wireless LAN. The ESSID of the wireless devices 140 must match the ESSID of the wireless servers 130 to establish communication. Typically, an ESSID is a 32-character case-sensitive string.

Further, the wireless server 130 and wireless devices 140 all operate on a particular frequency, or channel. As mentioned above, there are particular protocols on which wireless devices operate. Selection of a channel determines on which particular frequencies of a protocol the devices will operate. The wireless server 130 and wireless devices 140 can all operate on the same channel.

An additional hardware connectivity level uses MAC (Media Access Control) addressing. A MAC address is a physical hardware address that uniquely identifies each computer node on the gaming network. When the wireless servers 130 are set up by the gaming network manager, they are set up to only establish communication with particular (known) MAC addresses. For instance, the MAC addresses of the wireless devices are entered into an authorized MAC address list in the wireless server 130. Only wireless devices 140 having MAC addresses that are on such a list are allowed to establish communication with the wireless servers 130. In this way, unauthorized wireless devices cannot communicate to the wireless servers 130 and are prohibited from receiving any data from the gaming network 5.

Furthermore, the wireless servers 130 and wireless devices 140 are configured with a particular WEP (Wired Equivalent Privacy) key codes. WEP is a security mechanism defined within the IEEE 802.11 standard and is designed to make the security of the wireless medium equal to that of a wired communication. The gaming network administrator defines a WEP key and all of the wireless devices 130, 140 are set with the same key. Access is denied to any wireless device that does not have the assigned key. WEP keys come in different lengths, such as 40, 64, and 128-bit key lengths. The longer the key lengths, the more secure the code.

In addition to hardware connectivity, the server 110 communicates to the wireless devices 140 through a secure data connectivity layer. Specifically, the server 110 and the wireless device 140 can be connected through a VPN (Virtual Private Network). VPNs typically use a tunneling procedure, which places a data packet within another packet. The outer packet provides particular routing information for the embedded packet. Additionally, the embedded packet can be encrypted for additional security. In such systems, only the VPN server and the client know the proper "keys" to unlock the packets. Even if unauthorized wireless devices could gain access to a data packet, because the data within the outer packet is additionally encrypted, the unauthorized device could not read any of the data.

In addition to secure hardware and secure data layers, the server 110 communicates to the wireless device 140 through secure data application layers, such as XML (Extensible Markup Language), HTTP SSL (HyperText Transfer Protocol Secure Sockets Layer), and MFC (Microsoft Foundation Classes).

In operation, when a wireless device 140 communicates to one of the wireless servers 130, it must first have the proper frequency, channel settings, ESSID, WEP keys, and MAC address. If any of these settings are not correct, the wireless server prohibits access and, if possible, creates a log of the event. In some embodiments, the wireless device 140 can create an alert for casino personnel to investigate if someone is trying to hack into the secure network. Such an alert can be sent to an operator terminal at one of the bank controllers (FIG. 1), for example.

If the wireless device 140 has the proper frequency, channel settings, WEP key and MAC address, the DHCP server determines if the particular device should be allowed onto the wireless portion of the gaming network 5. A particular wireless device may only be authorized to log onto the gaming network 5 during particular times. The DHCP server monitors these actions and only allows the wireless device 140 to log in when so authorized. For instance, a particular device can be checked out to a particular employee. The DHCP server can be set up to allow a log in for that device only when that employee is scheduled to work. Or, the DHCP server can be set up to only allow a log in during the first 15 minutes of that employee's shift. If the employee did not log in during that time period, the DHCP server could block any log in of that wireless device 140 until the employee met with a manager, who could re-enable the DHCP server to allow login. Additionally, the DHCP server can be set up to automatically log out a previously logged in user who does not use the wireless device 140 for a period of time, for instance, for over 20 minutes. That prevents an unauthorized person from finding a misplaced wireless device 140 and taking advantage of the gaming network 5. Other detailed examples of using a wireless device are given below.

Further to those methods described above, data traffic from the wireless device 140 can be defined by its source, destination, protocol, and port, as is known in the art. Filtering, either by the DHCP server, or the server 110 itself can provide an additional level of security. For example, if the destination address of a packet is not an authorized destination, the server 110 can log out the particular wireless device 140 with the inaccurate destination address. Doing so provides additional security.

Figure 5:
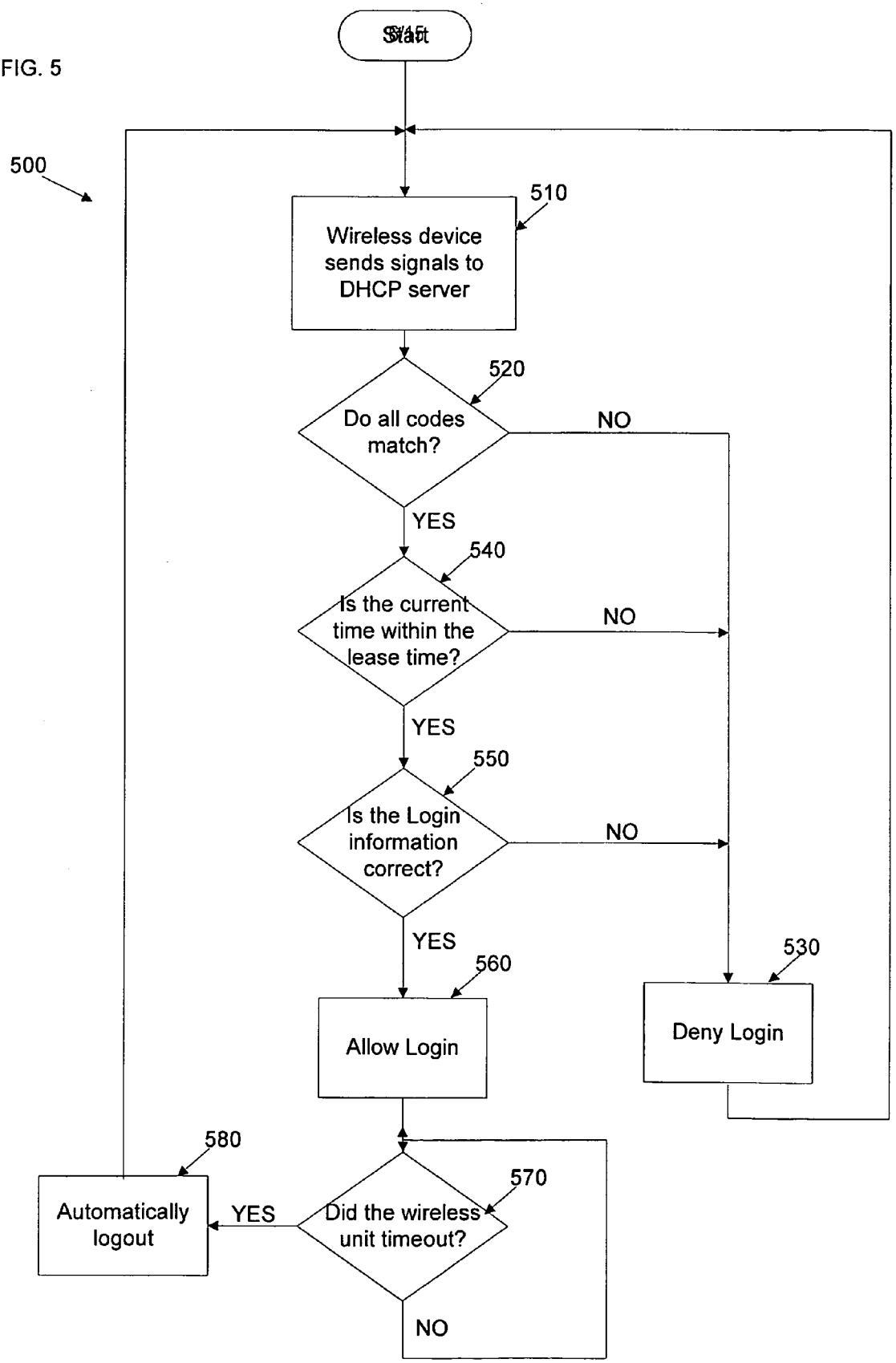
FIG. 5 is an example flow diagram illustrating an example flow for establishing communication between a wireless device and a wireless host on a gaming network.

FIG. 5 is an example flow diagram illustrating processes that can be used in the gaming network 5 according to embodiments of the invention. A flow 500 begins at a process 510 where a wireless device 140 sends signals to the wireless server 130 to log into the gaming network 5. The wireless device 140 automatically sends its ESSID, WEP key, and MAC address over the proper frequency and channel to the wireless server 130. If these codes do not match what the wireless server 130 is expecting in a process 520, the wireless server 130 denies login of the wireless device 140 in a process 530. Additionally, an error log entry or alert may be generated (not shown). Otherwise, the wireless server 130 checks the particular wireless device 140 against the lease reservation times for when it should be accessing the gaming network 5. If the lease reservation time does not match the present time in a process 540, i.e., the wireless device is not pre-arranged to be on the gaming network at that time, the login is denied in the process 530.

If the reservation time matches the present time in the process 540, the wireless server 130 accepts the login and password information in a process 550. If that information is correct, the login is allowed in a process 560. Otherwise, the login is denied in the process 430.

Once the wireless device 140 logs into the network in the process 560, the flow 500 proceeds to a timeout loop process 570. If the wireless device never times out, i.e., it is accepting some type of input from an operator during every timeout period, the flow 500 will remain in the loop process 570, and the wireless device 140 will remain logged into the gaming network 5. If however, the wireless device times out, then the wireless server 130 or other server 110 on the gaming network 5 automatically logs out the wireless device in a process 580, and the flow 500 returns to the beginning. In this way, the gaming network 5 always maintains only those wireless devices that are authorized to be on the network, and that are continuously communicating with the gaming network 5.

Figure 6:
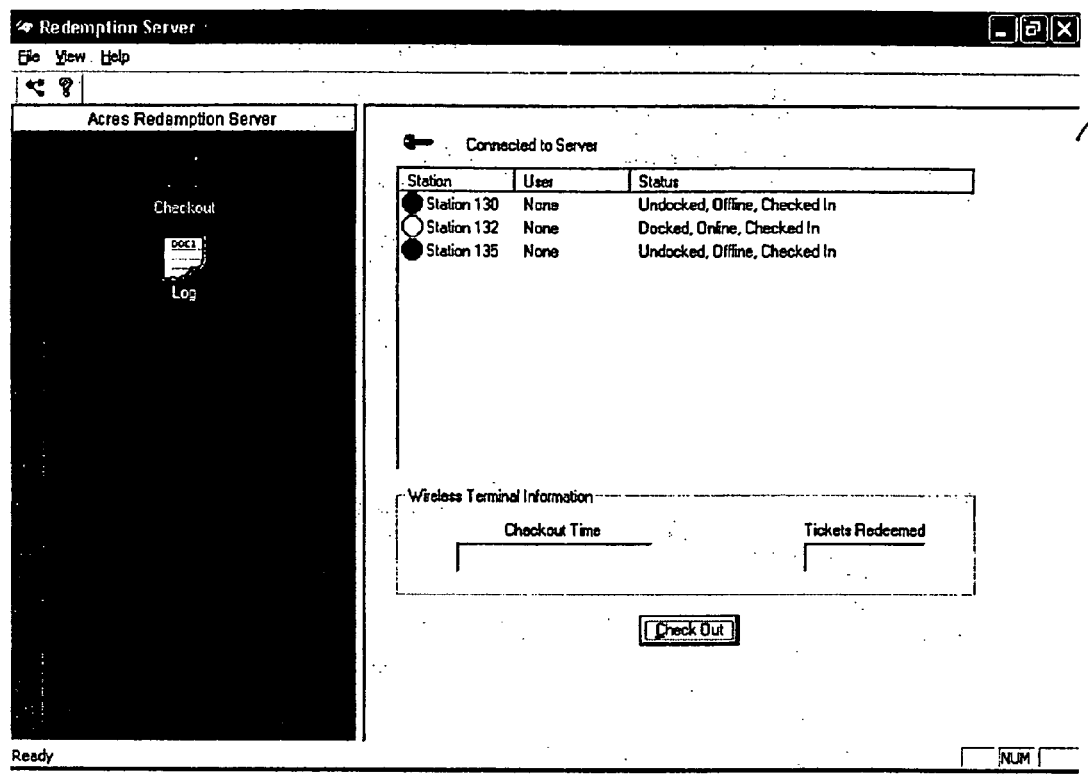
FIG. 6 is a screenshot of an example screen that can be shown on a server.

FIG. 6 illustrates a checkout screen 156 that can be shown in a window on a server, such as the MDA server 108 of FIG. 1B, the host 210 of FIG. 2, or the server 110 of FIG. 3. Data reflecting a status of each wireless device 140, 230 (illustrated as station 130, 132, and 135) is shown. Data such as whether a particular wireless device 140 is docked in a docking station, whether the device is checked in or checked out, and whether the device is communicating with the host 210 (FIG. 2) or wireless server 130 (FIG. 3) can be shown on the screen 156. A wireless device 140, 230 can be checked out using the process as described above, for instance. Once the PIN code is correctly entered on the wireless device 140, 230, the checkout screen 156 updates the window to show that the particular wireless device had been correctly checked out. Similarly, once the wireless device 140, 230 begins communicating with the wireless server 130, 210 the checkout screen 156 reflects that the particular wireless device 140, 230, is "online". On the checkout screen 156, a color indicator signifies which state each wireless device 140, 230 is in. For instance, a color indicator could show 'red' if a wireless device 140, 230 is offline, 'yellow' if a device is either online or checked out, and 'green' if the device is both online and checked out. Of course, other color schemes are possible.

One way to check-in a wireless device 140, 230, for example at the end of a shift, is for the employee to enter the wireless device back into the docking station, and swipe their ID card in a strip reader. The docking station need not be the same station from which the wireless device 140, 230 was originally checked out. Once finished, the checkout screen 156 would reflect the wireless device 140, 230 as docked (because it was in the docking station, offline (because it was not communicating with the wireless server 130, 210), and checked-in, because the check-in process had been completed.

Once a wireless device 140, 230 is checked out, the device logs into the server 110. When logging into the server 110 from the wireless device 140, 230, such as described above with reference to FIG. 5, a unit ID and network ID is associated within the gaming network 5 to the individual wireless device 140, 230. This could be stored on the server 110 (FIG. 2), or elsewhere on the gaming network 5, for instance. After the employee has logged into the gaming network, a name, employee ID, session ID etc., could be linked to the previously stored data of the wireless device 140, 230.

Figure 7:
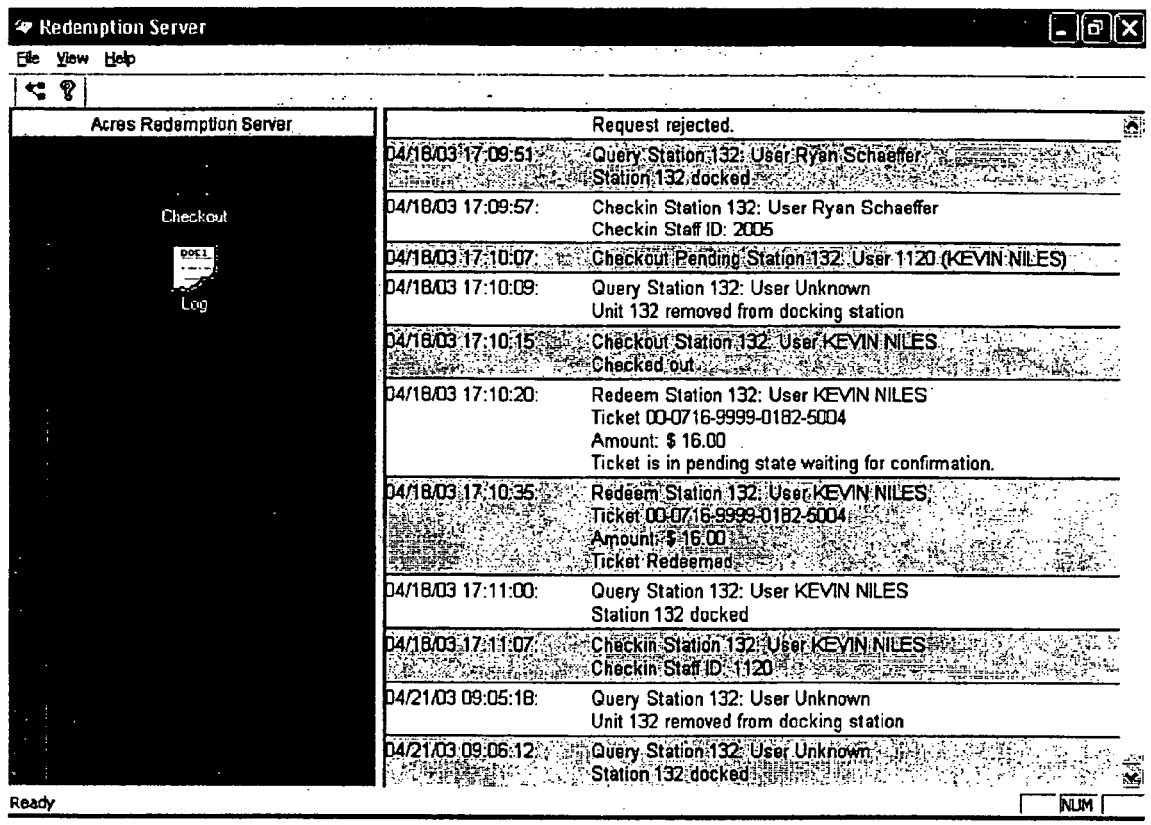
FIG. 7 is a screenshot of an example log screen that can be shown on a server.

FIG. 7 illustrates a sample log table that can be generated for events relating to a wireless device 140, 230. For instance, a timeline of a particular wireless device 140, 230, which in FIG. 7 is labeled station 132, is illustrated. First, at 17:09:51, the station 132 is docked in a docking station and then checked in at 17:09:57. The check-in was in response to the user (in this case "Ryan Schaeffer") swiping his employee ID card at the magnetic strip reader. At 17:10:07, the user "Kevin Niles" swiped his employee ID card at the magnetic strip reader, indicating that he is going to check out the station 132. At 17:10:09 the station 132 us removed from its cradle, and at 17:10:15, the check out is completed by Kevin Niles keying in his PIN code into the station 132.

Figure 8:
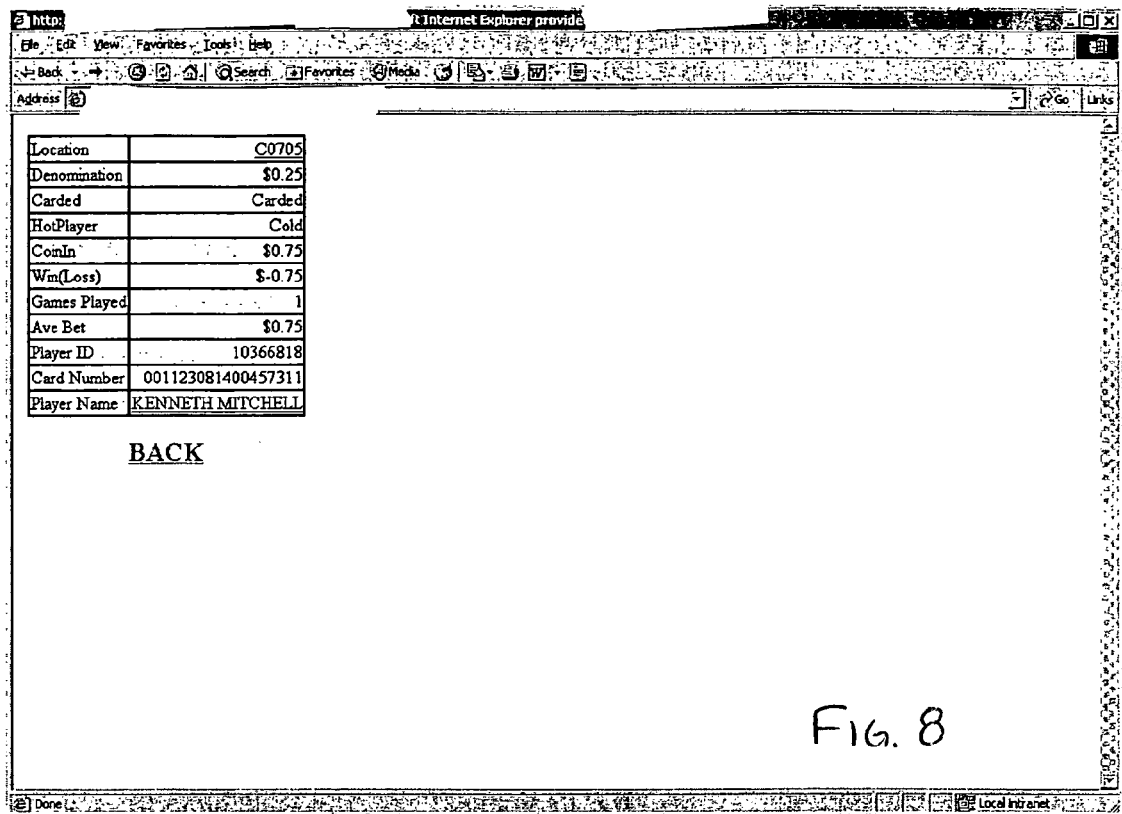

An example of a screen that can be shown by the browser 222 or wireless device 230 (FIG. 2) or on any other wireless device 140 (FIGS. 1, 3, 4) is illustrated in FIG. 8. In the following description, reference to the browser 222 indicates any device that can show the reference screen. In FIG. 8, the browser 222 shows that a location "C0705" is listed. This is the code giving the location for a particular gaming device 10. The denomination for the particular game is $0.25, and the player is "carded", i.e., the player using the gaming device 10 has entered a player identification card into the gaming device and is recognized by the gaming network 5. The coin-in is $0.75, which means, for the present session, the player has placed 75 cents in the machine. The next line shows that the player has lost his or her wager. Other fields give the average bet, player identification, identification card number and the name of the player.

By selecting hotlinks on the browser display 222, for instance the "Location" and the "Player Name" buttons, other displays are shown on the browser screen 222. Illustrated in FIG. 8 is only a single machine, but other display screens allow the user to view multiple games, or summary data of multiple games, as described below. For example, a user can view data by sections or by predicts. A user can also pick just the uncarded or carded play on the floor. Then, the user could drill down from, as an example, a carded or uncarded player to see exactly what that individual has been doing on the floor, how long the player has been playing, how many games have been played, what the average bet is, what the coin in is and if he's in a plus or minus, loss or win position, for example.

In addition to present playing data, also displayable on the browser 222 could be complementary expenses, bonusing activity, and the customers overall historical details, such as loyalty point balance, which is stored on the data repository 67, 69 (FIG. 1). Any data that is available on the gaming network 5, be it real-time data, or data stored in any of the data repositories 65, 67, 69, or elsewhere on the network can be displayed on the browser 222.

Figure 9:
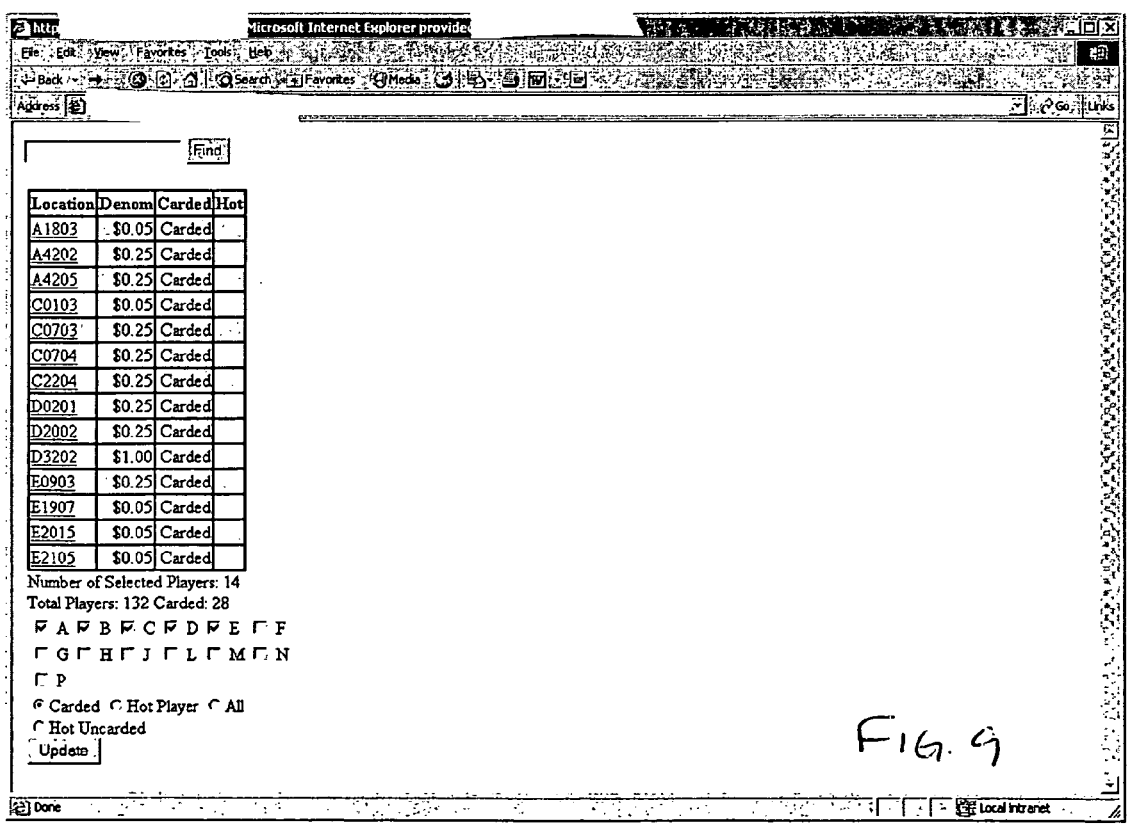
Figure 14:
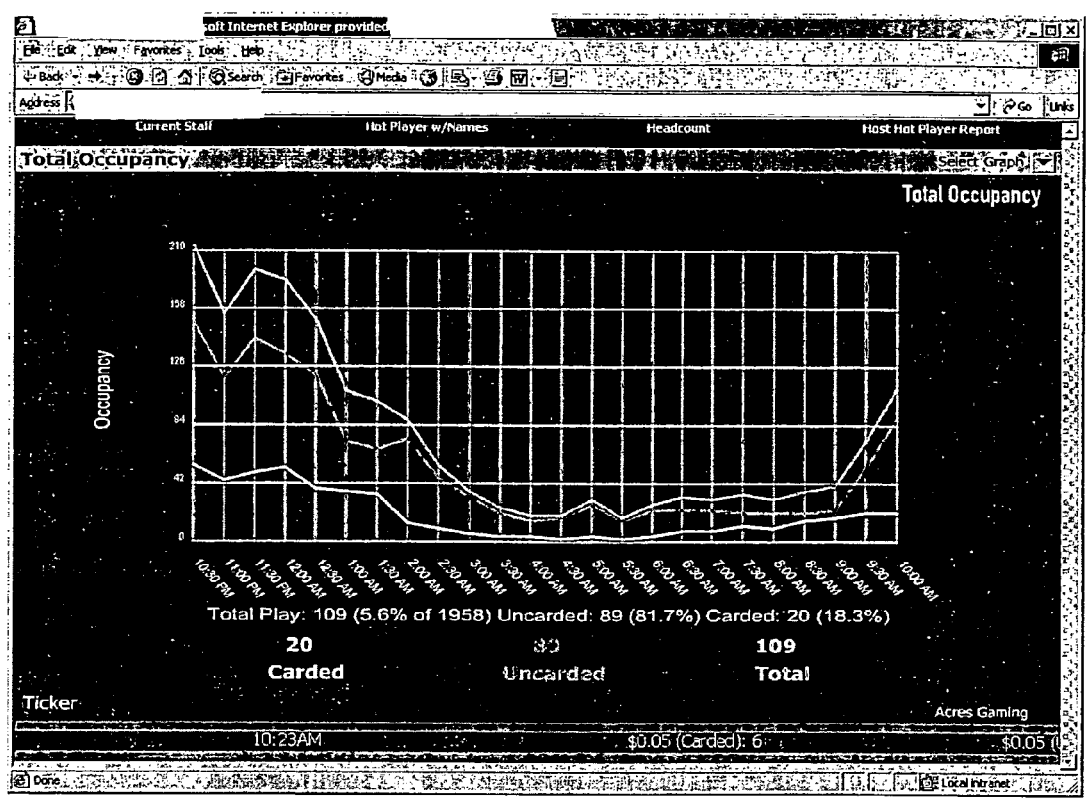
Figure 15:
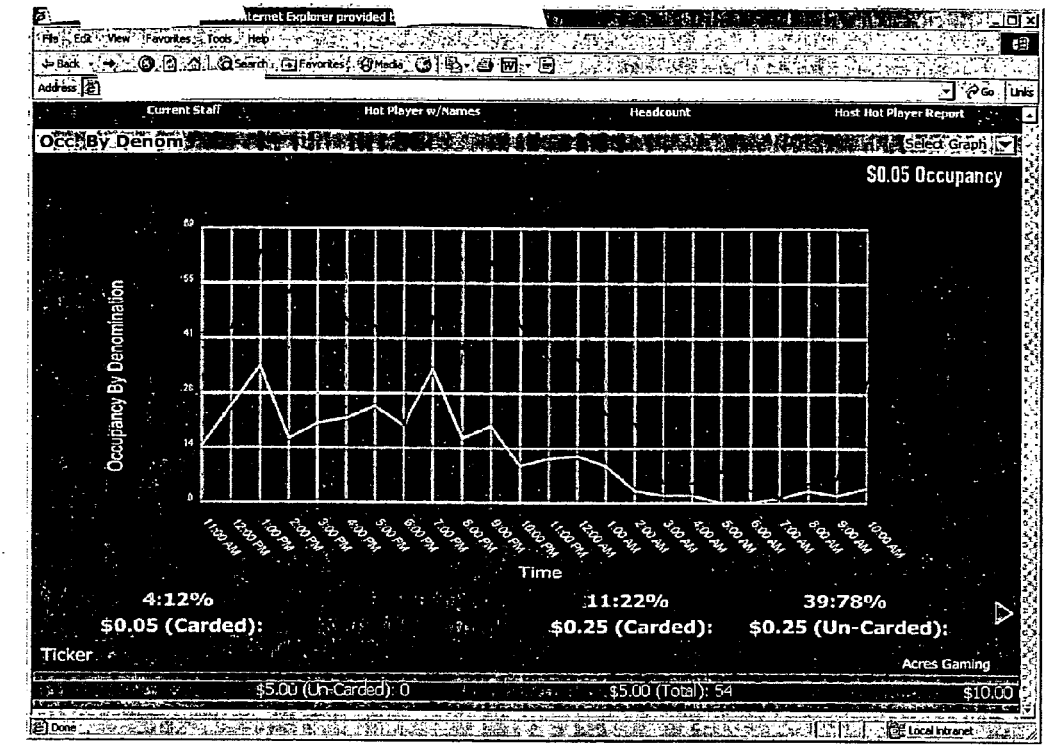
Figure 16:
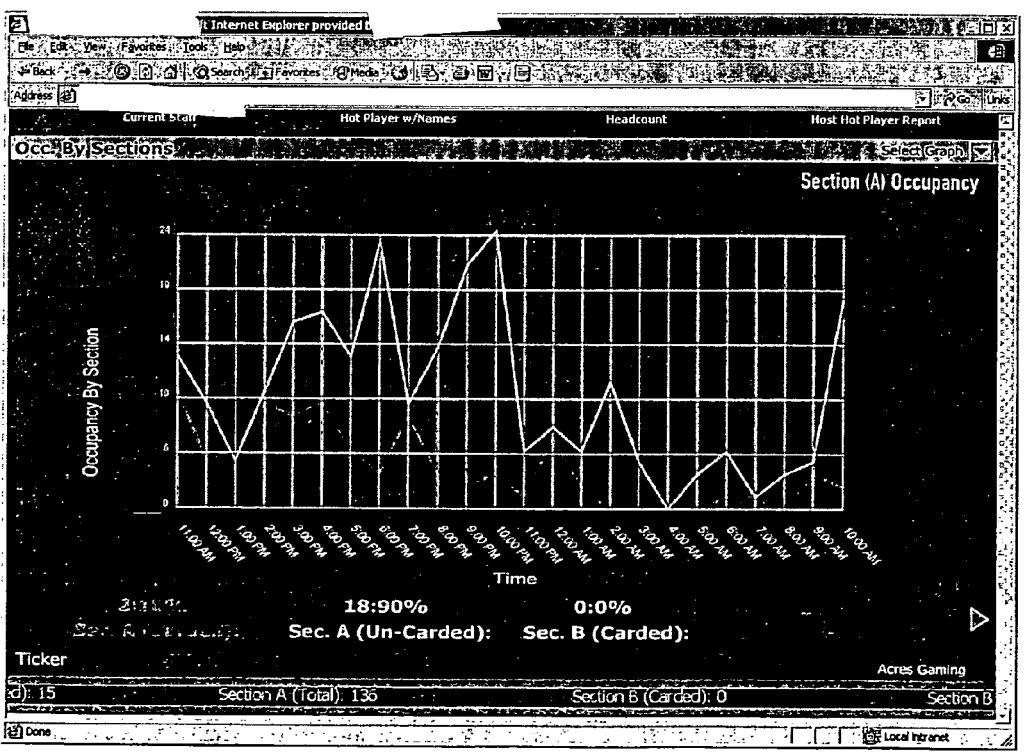
Figure 17:
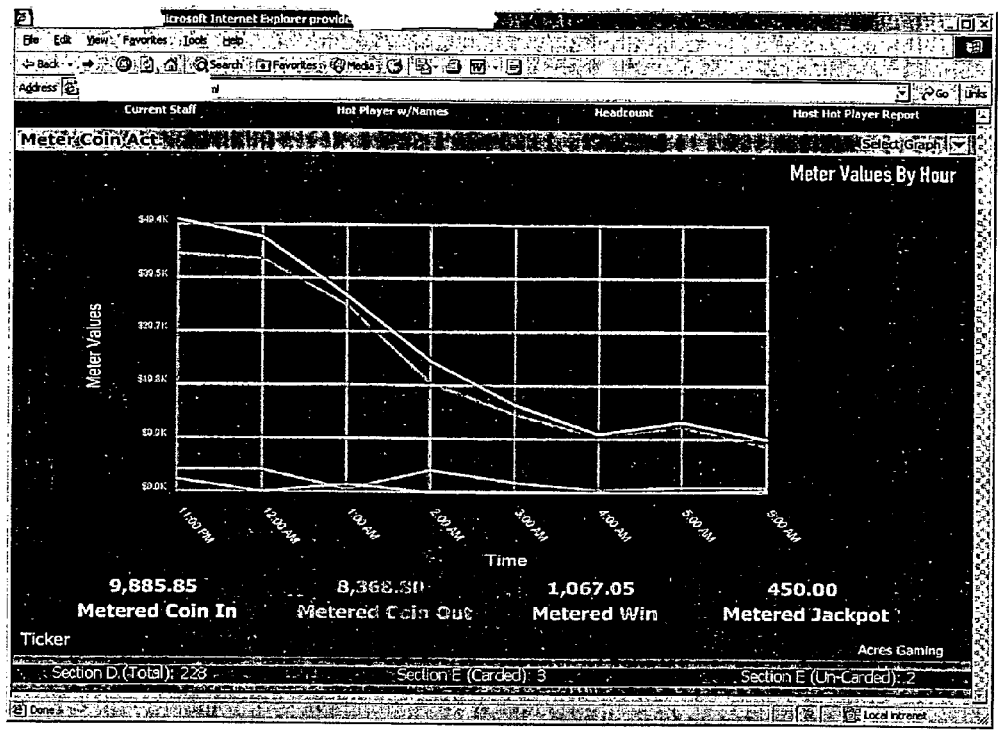
Figure 18:
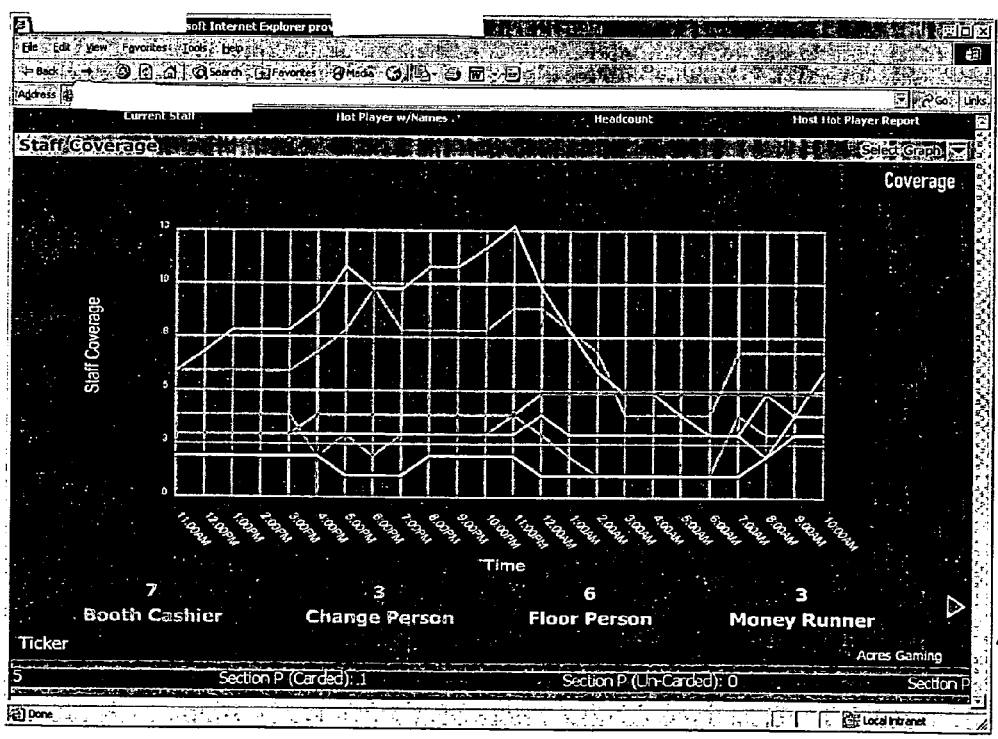

FIG. 9 is another screen that can be shown by the browser 222. This screen illustrates a number of different machines in regions A-E. Note that the regions A-E are also checked in the lower part of the screen. Selecting different region checkboxes would cause the machines in those areas to be displayed. Different pushbuttons also appear, which can be selected by a user. Carded and uncarded specifications designate, as described above, that the player of the particular gaming device 10 either has inserted or has not inserted a valid player tracking card. Additionally two pushbutton selections specify either "Hot players" or "Hot Uncarded Players". Hot players are those players who meet certain criteria, such as a minimum number of bets over a session (a session begins when a player begins playing a gaming device, or enters their player tracking card, and ends when the player removes his or her card. For uncarded players, a session begins when monetary value is deposited in a gaming device, and ends when the player has finished playing, which can be determined by, for example, 60 seconds of no activity on the game). Hot uncarded players are those who meet the "hot" criteria, but who did not insert a player tracking card. Hot uncarded players are described in the following section. By selecting the appropriate buttons, a user can narrow which machines are shown in the display.

FIG. 10 illustrates details for a particular player, while FIG. 11 illustrates details for a particular machine. FIG. 12 illustrates, in hourly increments, the number of total players utilizing a particular gaming network 5. This information can be used to develop specific promotions at certain times to promote more players at typical slow times. FIG. 13 is a report screen that is shown on the browser 222 that shows the "hot players" that have played in the last time period in the gaming network 5. Because these players are the type that a casino would like to have as regular players, particular attention is paid to them. Locating them as they are playing, as described below, can be beneficial to a casino because they may become loyalty patrons.

FIGS. 14-18 show data collected by the data presentation system in graph form. As described above, data can be shown as raw, list type data, or can be shown in easy-to-understand graphs such as those illustrated in these figures. The graphs include buttons selectable by the user (illustrated as small triangles in the figures) that allow the user to select other data that cannot fit on a single screen.

Figure 19:
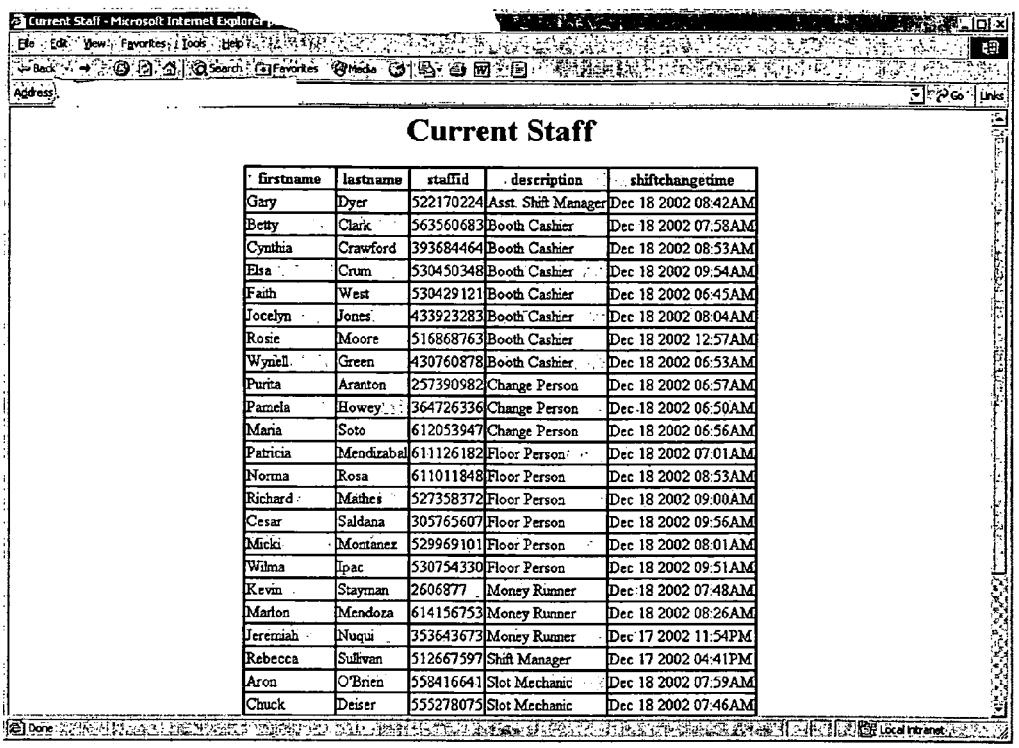

FIG. 19 is another screen that can be shown on the browser 222. Illustrated in this screen is data about casino employees, their names, identification numbers, titles, and the times they change shifts. Such data can be very valuable in managing personnel and maximizing people resources on a casino floor.

Using the Data Presentation System to Attract Players

There are many benefits to having data presented in real-time, as described above. One particular benefit is being able to detect players who are particularly attractive to a casino.

One such application is detecting "hot" players—i.e., those players who have a threshold level of bets, wagers, number of games, or time spent at a gaming device 10, for instance.

In operation, the host 210 (FIG. 2) can filter data to identify the players who meet predetermined criteria. Once these criteria are met, a signal can be sent to an employee user of the data presentation system giving a location of such a player. The player can then be approached and special offers made to encourage the player to sign up for a player card. The player card provides benefits to the player, as well as to the casino. Benefits to the player include bonuses, special awards, comps, etc. Benefits to the casino include patron loyalty, better advertising return, etc.

In practice, the server 214 can send to the browser 222 a screen including a display of the Location of the hot player, and whether the player is carded or uncarded. For instance, this could include a scrolling window. Below the scrolling window could be a child window for selection check boxes for restricting the Hot Player to only the section(s) selected. In addition, by touching the carded hot player or uncarded hot player with the stylus, the browser can pop-up a detail window on top of the scrolling parent window. The detail window can show specifics for that player, such as the hot player's name, coin in, and time played at that location and session, for instance. With an uncarded hot player, the detail may show only the coin in, and time played at the present location.

One way to identify hot players is to determine wager rate per unit time. This rate will be compared to an operator-defined threshold. Play rates exceeding the threshold will be considered hot play. The following casino specified parameters may be used in determining hot un-carded play:

Computation Period—This is the amount of time between successive play rate calculations. At the end of each period, play rate would be calculated as:

(Starting Coin-in-Ending Coin-in)/Computation Period

Play Rate Threshold—if play rate is greater than this value the player is considered a Hot Player Hot Un-Carded Session Determination The system must determine active hot un-carded play sessions based upon the hot un-carded player identification. The session declaration algorithm must minimize false alarms from players who make a single large bet, but who are, on average, playing at a rate lower than the hot un-carded player threshold. The following parameters will be used to determine a session:

N Session Start—This is the number of consecutive computation periods with hot un-carded play that would be required for the system to declare an active hot un-carded session is in progress N Session End—This is the number of consecutive computation periods without hot un-carded play that would be required for the system to declare the active hot un-carded session as completed.

Session start determination could work as follows. For a given machine, the gaming network 5 maintains a count of the number of consecutive computation periods with hot un-carded play. The count would be reset whenever a computation period without hot un-carded play occurred. When the count exceeded N Session Start, a hot un-carded session would be declared. The system would generate an event signifying the start of a hot un-carded session. The event would include the machine number, row number and the computed play rate at the start of the un-carded session Session end determination could work as follows: Once a hot un-carded session has started, the system will maintain a count of the number of consecutive computation periods without hot un-carded play. The count will be reset whenever a computation period occurs with hot un-carded play. When the count exceeds N Session End, the hot un-carded play session will be considered complete. An event will be generated signifying the end of the session. The event should include the machine number.

The algorithm above could be further refined to include the use of zero credit balance in determining hot un-carded session boundaries. Specifically, a hot un-carded session could be declared as completed only after the timing requirements described above were met and the number of credits on the machine had reached zero.

Communication of hot un-carded play sessions to casino staff could be accomplished using any of the following two options: at workstations monitored by club staff, or by a hand held wireless unit The system includes a real-time display of the starting and ending hot un-carded session events. The also provides means of generating the following reports or screens:

Current Hot Un-carded Player Session List—This report/screen is a list of all machines on the floor with hot un-carded play. The operator should be able to filter the by machine number, denomination and machine location. The list should include machine number, location, session start time, session duration, status information (see next section) and computed play rate at the start of the session. The operator should be able to sort on all fields Historical Hot Un-carded Player Session—This report/screen should give a list of hot un-carded play sessions for a user specified time period. The report should include: Session start and end time, machine number, status information (see next section), and play rate at the start of the session In order to qualify that a casino representative actually solicited the guest, a bar code scan can be placed at the end of the bank 30. The representative would enter the outcome of the greeting and then scan the end of the bank providing proof of a physical presence at the location at the time of solicitation. The barcode scan should be time stamped to compare with the HUC session time.

The time an employee is actually on the floor should be taken into consideration. If an employee is assigned booth time or is on a scheduled break there should be some functionality to denote these periods. This should be taken into consideration when calculating performance reporting on an individual representative A casino should have the ability to enter and track the status of hot un-carded play sessions. Possible status conditions that can be entered are, for example: Non-carded non-member, Non-carded member, New member, Session start time, and Barcode inquiry time.

The status entry screens include some simple means of status entry for each possible session. The screens should automatically capture the employee number of the staff member entering the status. The screens should allow for easy capture of the account number for any successful sign ups.

The default status assigned at the start of every session would be: Unknown patron.

The current status for each session would be shown in the Current Hot Un-carded Player Session List. The status condition at the end of a session would be displayed in the Historical Un-carded Player Session Report. The time between hot un-carded event registration and Team Member inquiry (barcode scan at location). Both reports include the employee number of the staff member that entered the status. If sign up was successful, the new patron account number would be displayed in the report Reporting of individual and property level productivity and conversion rate is possible, and could be broken out into the following reports: HUC players by hour, Individual HUC session breakout, Session Start, Session End, result of entice message, Result of Celebration message, Time of solicitation, Representative barcode verification, Employee name, Time stamp, Elapsed time from HUC event to Solicitation, Result of solicitation, Individual Representative performance, By month/week/day/hour, Assigned area, Sign in/Sign Out, Number of HUC players, Number of Responses, Response types by outcome, Time between HUC event and barcode response, Accumulated Theoretical win of converted customers Additional bonuses could be provide to those players who sign up for the player tracking cards. For example, these could include Sign-Up Bonuses, and Automatic "Conditional" Bonuses.

The intent of this bonus would be to offer prizes to patrons who have played above a certain threshold. Players would need to sign up for the card to receive the prize. Prize value would be similar to what they would have received if they played with a card. The bonus would work as follows: The size and nature of the prize must be such that carded players don't feel that they would be better off playing without a card. A casino attendant is sent to the machine to handle the enrollment process. One possible alternative to the personal approach would be to develop a way of giving the patron the opportunity of going to a booth at the end of their player session to sign up and collect their prize.

To sign up players, a scanner can be connected to the wireless device 230 that reads the MAG strips on a player tracking card or a drivers license, for example.

Employees could hold a wireless device 230 and watch the list of hot players and/or hot and uncarded players. They can then click on the machine location number that is actually showing that hot player and it will bring up a new screen that shows you all their stats. They can then receive a complete set of statistics on how many games have been played there, what kind of money like coin in and whether it's a win or loss situation.

Another benefit to the data presentation system is that employees could locate known players. For instance, they can type in their name and it will show them right where they are, and it will give their history.

Although examples of machines and processes have been described herein, nothing prevents embodiments of this invention from working with other types of machines and processes. Implementation of the data presentation system is straightforward in light of the above description. As always, implementation details are left to the system designer. Inclusion of description or illustration of a function in either the data presentation system or the gaming network is not dispositive that the function is located in or must be performed there.

Thus, although particular embodiments for a data presentation system have been discussed, it is not intended that such specific references be considered as limitations upon the scope of this invention.

What is claimed is:

1. A casino gaming network, comprising:
    a plurality of gaming machines for use by players;
    one or more information servers in communication with the plurality of gaming machines, the one or more information servers structured to store data related to the plurality of gaming machines and related to players of the gaming machines;
    a plurality of secure wireless servers structured to couple to the one or more information servers, the secure wireless servers being located in an area in which the gaming machines are available for play;
    one or more portable secure wireless receivers structured to couple via a wireless link to at least one of the secure wireless servers;
    an image generator coupled to the one or more information servers and to at least one of the secure wireless servers, the image generator structured to generate an image for display on one or more of the wireless receivers, the image including data stored on the one or more information servers; and
    wherein the one or more information servers is configured to transmit to at least one of a workstation or one or more of the wireless receivers an identification of one of the gaming machines that is being played by a desirable unidentified player.

2. The gaming network of claim 1 wherein the image is a graph.

3. The gaming network of claim 1 wherein the image is a table.

4. The gaming network of claim 1 wherein the image comprises an amount of coin-in for a given amount of gaming machines over a time period.

5. The gaming network of claim 1 wherein data from one or more of the gaming machines in the gaming network can be excluded from data used to generate the image.

6. The gaming network of claim 1 wherein the image comprises data indicating whether players of the gaming machines are identified players.

7. The gaming network of claim 1 wherein the image comprises an amount of activity from only a portion of the gaming machines in the gaming network.

8. The gaming network of claim 1 wherein the image comprise a list of employees currently working.

9. The gaming network of claim 1 wherein the image comprises a listing of ones of the plurality of gaming machines and the duration of gaming sessions that have been played on them.

10. The gaming network of claim 1 wherein the one or more information servers is configured to identify the one of the gaming machines that is being played by a desirable unidentified player in response to identification of a desirable play session on the one of the gaming machines.

11. The gaming network of claim 10 wherein the one or more information servers is configured to identify the desirable play session in response to a wager rate on the one of the gaming machines exceeding a play rate threshold for at least a predefined period of time.

12. A method of operating a casino gaming network comprising a plurality of gaming machines, the method comprising:

coupling a plurality of secure wireless servers to one or more information servers, the secure wireless servers being located in an area in which the gaming machines are available for play;

coupling one or more portable secure wireless receivers via a wireless link to at least one of the secure wireless servers;

receiving data from the gaming machines at the one or more information servers the data related to the gaming machines and related to players of the gaming machines;

identifying one of the gaming machines that is being played by a desirable unidentified player;

automatically transmitting to the one or more portable secure wireless receivers or a workstation, for use by a casino employee, an identification of the one of the gaming machines; and coupling an image generator to the one or more information servers and to at least one of the secure wireless servers, the image generator structured to generate an image for display on one or more of the wireless receivers, the image including data stored on the one or more information servers.

13. The method of claim 12 wherein identifying the one of the gaming machines comprises identifying a desirable play session on the one of the gaming machines.

14. The method of claim 13 wherein identifying a desirable play session comprises identifying a desirable play session in response to a wager rate on the one of the gaming machines exceeding a play rate threshold for at least a predefined period of time.

15. The method of claim 12 wherein automatically transmitting comprises automatically transmitting in a secure wireless communication.

16. The method of claim 12 further comprising:
generating a graphic display of data gathered from the received data; and
displaying the graphic display on the workstation.

17. The method of claim 16 wherein generating a graphic display comprises generating a graph.

18. The method of claim 16 wherein generating a graphic display comprises generating a table.

19. The method of claim 16 wherein generating a graphic display comprises displaying an amount of coin-in for a given amount of gaming machines over a time period.

20. The method of claim 16 wherein generating a graphic display comprises excluding data from one or more of the gaming machines in the gaming network.

21. The method of claim 16 wherein generating a graphic display comprises generating data indicating whether players of the gaming machines are identified players.

22. The method of claim 12 wherein receiving data excludes receiving data indicative of an outcome of a game played on one of the gaming machines.

23. The method of claim 12 wherein receiving data includes assembling data other than an outcome of a game played on one of the gaming machines.

* * * * *